United States Patent
Yamada et al.

(10) Patent No.: US 11,071,118 B2
(45) Date of Patent: *Jul. 20, 2021

(54) TERMINAL APPARATUS, BASE STATION APPARATUS, METHOD OF A TERMINAL APPARATUS, AND METHOD OF A BASE STATION APPARATUS EACH USING A MEASUREMENT CONFIGURATION

(71) Applicant: SHARP KABUSHIKI KAISHA, Sakai (JP)

(72) Inventors: Shohei Yamada, Sakai (JP); Katsunari Uemura, Sakai (JP); Yasuyuki Kato, Sakai (JP); Daiichiro Nakashima, Sakai (JP); Waho Oh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,890

(22) Filed: Dec. 2, 2019

(65) Prior Publication Data

US 2020/0107316 A1  Apr. 2, 2020

Related U.S. Application Data

(60) Division of application No. 16/178,283, filed on Nov. 1, 2018, now Pat. No. 10,499,401, which is a division
(Continued)

(30) Foreign Application Priority Data

Dec. 26, 2008  (JP) .................................. 2008-332142

(51) Int. Cl.
*H04L 12/28* (2006.01)
*H04W 72/04* (2009.01)
(Continued)

(52) U.S. Cl.
CPC ......... *H04W 72/048* (2013.01); *H04W 24/10* (2013.01); *H04W 72/0453* (2013.01);
(Continued)

(58) Field of Classification Search
CPC .............. H04W 24/10; H04W 72/048; H04W 72/0453; H04W 24/20; H04B 17/309; H04L 25/0202
(Continued)

(56) References Cited

U.S. PATENT DOCUMENTS 5,828,659 A  10/1998 Teder et al.
7,072,663 B2  7/2006 Ramos et al.
(Continued)

FOREIGN PATENT DOCUMENTS

EP  2 348 658 A2  7/2011
EP  2355606 A1  8/2011
(Continued)

OTHER PUBLICATIONS

3GPP TS 25.331, vol. 8.4.0, 3rd Generation Partnership Project; Technical Specification Group Radio Access Network; Radio Resource Control (RRC); Protocol Specification (Release 8), Sep. 2008, pp. 254-277.
(Continued)

*Primary Examiner* — John Pezzlo
(74) *Attorney, Agent, or Firm* — Birch, Stewart, Kolasch & Birch, LLP

(57) ABSTRACT

A communication system includes a terminal apparatus and a base station apparatus. The terminal apparatus communicates with a base station apparatus by carrier aggregation using a plurality of serving cells, where each of the plurality of serving cells has a different frequency. In addition, the terminal apparatus removes a measurement identity relevant
(Continued)

to a serving cell of the plurality of serving cells based on that the serving cell was removed.

4 Claims, 20 Drawing Sheets

Related U.S. Application Data of application No. 15/786,198, filed on Oct. 17, 2017, now Pat. No. 10,123,334, which is a continuation of application No. 14/932,711, filed on Nov. 4, 2015, now Pat. No. 9,814,049, which is a division of application No. 14/070,318, filed on Nov. 1, 2013, now Pat. No. 9,204,311, which is a division of application No. 13/142,255, filed as application No. PCT/JP2009/069040 on Nov. 9, 2009, now Pat. No. 8,605,616.

(51) Int. Cl.
| | | |
|---|---|---|
| H04W 24/10 | (2009.01) | |
| H04J 1/16 | (2006.01) | |
| H04L 25/02 | (2006.01) | |
| H04L 27/26 | (2006.01) | |
| H04W 36/00 | (2009.01) | |
| H04W 72/00 | (2009.01) | |
| H04W 88/08 | (2009.01) | |

(52) U.S. Cl.
CPC ...... *H04L 25/0202* (2013.01); *H04L 27/2601* (2013.01); *H04W 36/0085* (2018.08); *H04W 36/0094* (2013.01); *H04W 72/00* (2013.01); *H04W 88/08* (2013.01)

(58) Field of Classification Search
USPC .................................. 370/252, 329, 241, 430
See application file for complete search history.

(56) References Cited

U.S. PATENT DOCUMENTS

| | | | |
|---|---|---|---|
| 7,636,573 B2 | 12/2009 | Walton et al. | |
| 7,986,660 B2 | 7/2011 | Ramos et al. | |
| 8,010,469 B2 | 8/2011 | Kapoor et al. | |
| 9,712,213 B2 | 7/2017 | Mochizuki et al. | |
| 2006/0212194 A1* | 9/2006 | Breed ................ | G07C 5/008 701/1 |
| 2008/0069028 A1 | 3/2008 | Richardson | |
| 2008/0311910 A1 | 12/2008 | Ishii et al. | |
| 2009/0247150 A1 | 10/2009 | Fischer et al. | |
| 2009/0316659 A1 | 12/2009 | Lindoff et al. | |
| 2010/0118720 A1 | 5/2010 | Gauvreau et al. | |
| 2010/0303039 A1 | 12/2010 | Zhang et al. | |
| 2011/0081868 A1* | 4/2011 | Kim ................ | H04W 24/10 455/67.11 |
| 2011/0103333 A1 | 5/2011 | Berggren et al. | |
| 2011/0274099 A1 | 11/2011 | Kwon et al. | |
| 2012/0004010 A1 | 1/2012 | Tamura et al. | |
| 2013/0121200 A1 | 5/2013 | Li et al. | |
| 2015/0215900 A1 | 7/2015 | Jung et al. | |
| 2017/0164400 A1 | 6/2017 | Fong et al. | |
| 2017/0181145 A1 | 6/2017 | Fong et al. | |
| 2018/0020500 A1 | 1/2018 | Pelletier et al. | |

FOREIGN PATENT DOCUMENTS

| | | |
|---|---|---|
| JP | 8-500474 A | 1/1996 |
| JP | 2002-112311 A | 4/2002 |
| JP | 2008-28682 A | 2/2008 |
| WO | WO 2009/152657 A1 | 12/2009 |
| WO | WO 2010/051209 A1 | 5/2010 |

OTHER PUBLICATIONS

3GPP TS 36.300, vol. 8.4.0, Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Mar. 2008.

3GPP TS 36.331 V8.4.0 (Dec. 2008) 3rd Generation Partnership Project; Technical Specification Group Radio Access Network; Evolved Universal Terrestrial Radio Access (E-UTRA) Radio Resource Control (RRC); Protocol specification (Release 8).

CMCC, "Multicarrier Operation and Pdcch design of Carrier Aggregation", 3GPP TSG RAN WG1 meeting #55, R1-084333, Nov. 10-14, 2008.

Ericsson, "Carrier aggregation in LTE-Advanced," TSG-RAN WG1 #53bis, R1-082468, Warsaw, Poland, Jun. 30-Jul. 4, 2008, 6 pages, XP-002570947.

Ericsson, "E-UTRA Radio Measurement Configuration," TSG-RAN WG2 #58bis R2-072550, Jun. 25-29, 2007, 10 pages.

ETRI, "Structure and configuration of component carriers in carrier aggregation," 3GPP TSG RAN WG1 Meeting #54bis R1-083545, Sep. 29-Oct. 3, 2008, pp. 1-2.

Huawei, "Carrier aggregation in Advanced E-UTRA," 3GPP TSG RAN WG1#53bis R1-082448, Warsaw, Poland, Jun. 30-Jul. 4, 2008, 4 pages, XP050110721.

Japanese Office Action dated Sep. 29, 2015 for Application No. 2014-234375.

Nokia Corporation, Nokia Siemens Networks, "Clarification for the Value Range of S-measure and RSRP and RSRQ in RRC" [online], 3GPP TSG-RAN WG2 #64, R2-086164, Internet Nov. 10-14, 2008 <URL:http://www.3gpp.org/ftp/tsg_ran/WG2_RL2/TSGR2_64/Docs/R2-086164.zip>.

Non-Final Office Action issued in corresponding U.S. Appl. No. 15/786,198 dated Jan. 26, 2018.

Notice of Allowance issued in corresponding U.S. Appl. No. 15/786,198 dated Jul. 5, 2018.

U.S. Notice of Allowance issued in U.S. Appl. No. 14/070,318 dated Aug. 31, 2015.

U.S. Notice of Allowance issued in U.S. Appl. No. 14/932,711 dated Jul. 7, 2017.

U.S. Notice of Allowance issued in U.S. Appl. No. 16/178,283 dated Jul. 29, 2019.

U.S. Office Action issued in U.S. Appl. No. 14/070,318 dated Jun. 3, 2015.

U.S. Office Action issued in U.S. Appl. No. 14/932,711 dated Feb. 3, 2017.

U.S. Office Action issued in U.S. Appl. No. 16/178,283 dated Mar. 28, 2019.

Nokia Siemens Networks, Nokia, "Algorithms and results for autonomous component carrier selection for LTE-Advanced," 3GPP TSG RAN WG1 #55 Meeting R1-084321, Nov. 10-14, 2008, 5 pages.

Qualcomrn Europe, "Measurement considerations for multicarrier operation", 3GPP TSG-RAN WG2 meeting #66bis, Jun. 29-Jul. 3, 2009, Los Angeles, U.S.

Supplementary European Search Report dated Sep. 20, 2012 for European Application No. 09834634.9.

Supplementary European Search Report dated Apr. 5, 2012 for European Application No. 09834633.1.

U.S. Notice of Allowance issued in U.S. Appl. No. 13/142,255 dated Jul. 23, 2013.

U.S. Notice of Allowance issued in U.S. Appl. No. 13/142,394 dated Sep. 26, 2013.

U.S. Office Action issued in U.S. Appl. No. 13/142,255 dated Feb. 14, 2013.

U.S. Office Action issued in U.S. Appl. No. 13/142,394 dated Feb. 25, 2013.

3GPP TSG-RAN WG2 Meeting #68, "Measurement Report Triggering in Carrier Aggregation", R2-096545, Jeju, Korea, Nov. 9-13, 2009.

(56) References Cited

OTHER PUBLICATIONS

3GPP TSG-RAN WG2 Meeting #68, "Measurement Modeling in CA", R2-096766, Jeju, Korea, Nov. 9-13, 2009.

* cited by examiner

TERMINAL APPARATUS, BASE STATION APPARATUS, METHOD OF A TERMINAL APPARATUS, AND METHOD OF A BASE STATION APPARATUS EACH USING A MEASUREMENT CONFIGURATION

CROSS-REFERENCE TO RELATED APPLICATIONS

This application is a Divisional of application Ser. No. 16/178,283 filed Nov. 1, 2018, which is a Divisional of application Ser. No. 15/786,198 filed Oct. 17, 2017 (now U.S. Pat. No. 10,123,334 issued Nov. 6, 2018) which is a Continuation of Ser. No. 14/932,711 filed Nov. 4, 2015 (now U.S. Pat. No. 9,814,049 issued Nov. 7, 2017) which is a Divisional of application Ser. No. 14/070,318 filed Nov. 1, 2013 (now U.S. Pat. No. 9,204,331 issued Dec. 1, 2015) which is a Divisional of application Ser. No. 13/142,255, filed on Sep. 20, 2011 (now U.S. Pat. No. 8,605,616 issued Dec. 10, 2013). Application Ser. No. 13/142,255 is the National Phase of PCT International Application No. PCT/JP2009/069040 filed on Nov. 9, 2009 under 35 U.S.C. § 371, which claims the benefit of priority of JP2008-332142, filed Dec. 26, 2008. The entire contents of each of the above-identified applications are hereby incorporated by reference.

TECHNICAL FIELD

The present invention relates to a mobile station apparatus, base station apparatus, management method in a mobile station apparatus, processing section and communication system, and, more particularly, to a communication system comprising a plurality of component carriers and a mobile station apparatus, base station apparatus, management method in a mobile station apparatus, processing section and communication system used in the communication system.

BACKGROUND ART

3GPP (3rd Generation Partnership Project) is a project for studying and creating specifications of a cellular phone system based on a network developed from W-CDMA (Wideband-Code Division Multiple Access) and GSM (Global System for Mobile Communication).

In 3GPP, it has standardized the W-CDMA system as a third-generation cellular mobile communication system and the services are sequentially started. HSDPA (High-Speed Downlink Packet Access) which communication speed is further improved has also been standardized and the services are started.

In 3GPP, it is currently studying a mobile communication system (hereinafter, LTE-A (Long Term Evolution-Advanced) or Advanced-EUTRA) that utilizes the Evolution of the third generation wireless access technology (referred to as LTE (Long Term Evolution) or EUTRA (Evolved Universal Terrestrial Radio Access)) and a further wider system bandwidth to realize faster data transmission and reception.

The OFDMA method (Orthogonal Frequency Division Multiple Access) is a method using mutually orthogonal subcarriers to perform user-multiplexing and is proposed as the downlink communication method in EUTRA.

Technologies applied to the OFDMA method include an adaptive modulation and coding scheme (AMCS) based on adaptive radio link control (link adaptation) of channel encoding and others.

AMCS is a scheme for switching wireless transmission parameters (also referred to as AMC modes) such as an error-correcting method, an encoding ratio of error correction, and a data modulation multiple-valued number depending on channel qualities of mobile station apparatuses so as to efficiently perform a high-speed packet data transmission.

The channel qualities of the mobile station apparatuses are fed back to a base station apparatus by using CQI (Channel Quality Indicator).

FIG. 20 is a diagram of a channel configuration used in a conventional wireless communication system. The channel configuration is used in a wireless communication system such as EUTRA (see Nonpatent Document 1). A wireless communication system depicted in FIG. 8 includes a base station apparatus 100, mobile station apparatuses 200a, 200b, and 200c. R01 indicates a range where the base station apparatus 100 is able to communicate and the base station apparatus 100 communicates with mobile station apparatuses located within this range R01.

In EUTRA, the downlink for transmitting signals from the base station apparatus 100 to the mobile station apparatuses 200a, 200b, and 200c uses a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH).

In EUTRA, the uplink for transmitting signals from the mobile station apparatuses 200a, 200b, and 200c to the base station apparatus 100 uses a physical uplink shared channel (PUSCH), a physical uplink control channel (PUCCH), and a physical random access channel (PRACH).

LTE-A follows the basic system of EUTRA. While a typical system uses a contiguous frequency band, it is proposed for LTE-A to use a plurality of contiguous or non-contiguous frequency bands (hereinafter, carrier components or component carriers) in a composite manner to implement operation as one wider frequency band (wider system band) (frequency band aggregation: spectrum aggregation, carrier aggregation). In other words, one system band comprises of a plurality of component carriers each of which has a bandwidth corresponding to a part of the system band that is an available frequency band. Mobile station apparatuses of LTE and LTE-A can operate in each component carrier. It is also proposed to give different frequency bandwidths to a frequency band used for the downlink communication and a frequency band used for the uplink communication so as to flexibly use a frequency band allocated to a mobile communication system.

PRIOR ART DOCUMENT

Nonpatent Document

Nonpatent Document 1: 3GPP TS (Technical Specification) 36.300, V8.4.0 (2008-03), Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

SUMMARY OF THE INVENTION

Problems to be Solved by the Invention

However, it is difficult to apply a measurement method used for the communication in one cell to a measurement method for the communication through a plurality of component carriers in a conventionally known wireless communication system. Since communication is performed through a plurality of component carriers, it is not known which component carrier should be used as a serving cell to perform the measurement. It is also problematic that measurement parameters cannot be configured with consideration for parameters specific to the component carriers and that measurement configuration has no flexibility when a component carrier is added or modified.

The present invention has been conceived in view of the situations and it is therefore an object of the present invention to provide a mobile station apparatus, base station apparatus, management method in a mobile station apparatus, processing section and communication system which are efficiently capable of managing the measurement configuration maintained in a base station apparatus and a mobile station apparatus in a system comprising a plurality of component carriers and quickly capable of executing communication.

A first technical means according to the present invention is a mobile station apparatus in a communication system comprising a base station apparatus and a mobile station apparatus, wherein at the time of communication by carrier aggregation using a plurality of cells with each cell having different frequency, the mobile station apparatus determines a measurement reference cell used for an evaluation of event triggering criteria from among the plurality of the cells based on a measurement object linked to reporting configurations that indicate event triggering criteria used for a measurement report.

A second technical means according to the present invention is a mobile station apparatus of the first technical means, wherein the mobile station apparatus evaluates the event triggering criteria using measurement results for the measurement reference cell and reports measurement results to the base station apparatus when the event triggering criteria are satisfied.

A third technical means according to the present invention is a mobile station apparatus of the first technical means, wherein the mobile station apparatus evaluates the event triggering criteria using a specific offset value for a cell that is not determined as the measurement reference cell and reports measurement results to the base station apparatus when the event triggering criteria are satisfied.

A fourth technical means according to the present invention is a mobile station apparatus of the third technical means, wherein the mobile station apparatus evaluates the event triggering criteria using a specific offset value for the measurement reference cells and reports measurement results to the base station apparatus when the event triggering criteria are satisfied.

A fifth technical means according to the present invention is a mobile station apparatus of the first technical means, wherein the mobile station apparatus determines a measurement reference cell used for an evaluation of event triggering criteria from among the plurality of the cells based on the frequency to be measured.

A sixth technical means according to the present invention is a base station apparatus in a communication system comprising a base station apparatus and a mobile station apparatus, wherein at the time of communication by carrier aggregation using a plurality of cells with each cell having different frequency, the base station apparatus makes the mobile station apparatus determine a measurement reference cell used for an evaluation of event triggering criteria, by the configurations of reporting configurations that indicate event triggering criteria used for a measurement report, a measurement object linked to reporting configurations and the plurality of cells.

A seventh technical means according to the present invention is a management method in a mobile station apparatus in a communication system comprising a base station apparatus and a mobile station apparatus, wherein a measurement reference cell used for an evaluation of event triggering criteria is determined from among the plurality of the cells based on a measurement object linked to reporting configurations that indicate event triggering criteria used for a measurement report at the time of communication by carrier aggregation using the plurality of cells with each cell having different frequency.

An eighth technical means according to the present invention is a processing section that executes the management method of the seventh technical means, wherein the processing section executes the management method by using a plurality of processing block sections and a higher block section that integrates to control the plurality of the processing block sections.

A ninth technical means according to the present invention is a mobile station apparatus in a communication system comprising a base station apparatus and a mobile station apparatus, wherein for a plurality of cells with each cell having different frequency, the mobile station apparatus considers a reference cell for a measurement object at the time of performing measurements as a measurement reference cell, one or a plurality of the measurement reference cells for the measurement object are indicated from the base station apparatus, and the mobile station apparatus performs the measurements of the measurement object for the indicated one or a plurality of the measurement reference cells.

A tenth technical means according to the present invention is a mobile station apparatus in a communication system comprising a base station apparatus and a mobile station apparatus, wherein for a plurality of cells with each cell having different frequency, one or a plurality of the measurement reference cells for a measurement object are indicated from the base station apparatus, and the mobile station apparatus performs measurement by applying an offset value corresponding to a frequency of a cell as a reference for a measurement object at the time of performing measurements.

An eleventh technical means according to the present invention is a communication system comprising a base station apparatus and a mobile station apparatus, wherein for a plurality of cells with each cell having different frequency, the mobile station apparatus considers a reference cell for a measurement object at the time of performing measurements as a measurement reference cell, one or a plurality of the measurement reference cells for the measurement object are indicated from the base station apparatus, and performs the measurements of the measurement object for the indicated one or a plurality of the measurement reference cells.

A twelfth technical means according to the present invention is a communication system comprising a base station apparatus and a mobile station apparatus, wherein for a plurality of cells with each cell having different frequency, the mobile station apparatus is indicated one or a plurality of the measurement reference cells for a measurement object from the base station apparatus, and performs the measurements by applying an offset value corresponding to a frequency of a cell as a reference for a measurement object at the time of performing measurements.

A thirteenth technical means according to the present invention is a communication system comprising a base station apparatus and a mobile station apparatus, wherein at the time of communication by carrier aggregation using a plurality of cells with each cell having different frequency, the mobile station apparatus determines a measurement reference cell used for an evaluation of event triggering criteria from among a plurality of the cells based on a measurement object linked to reporting configurations that indicate event triggering criteria used for a measurement report.

Effect of the Invention

The mobile station apparatus, base station apparatus, management method in a mobile station apparatus, processing section and communication system of the present invention are efficiently capable of managing the measurement configuration configured by the base station apparatus and the mobile station apparatus in the system comprising a plurality of component carriers and quickly capable of executing communication.

MODES FOR CARRYING OUT THE INVENTION

Figure 1:
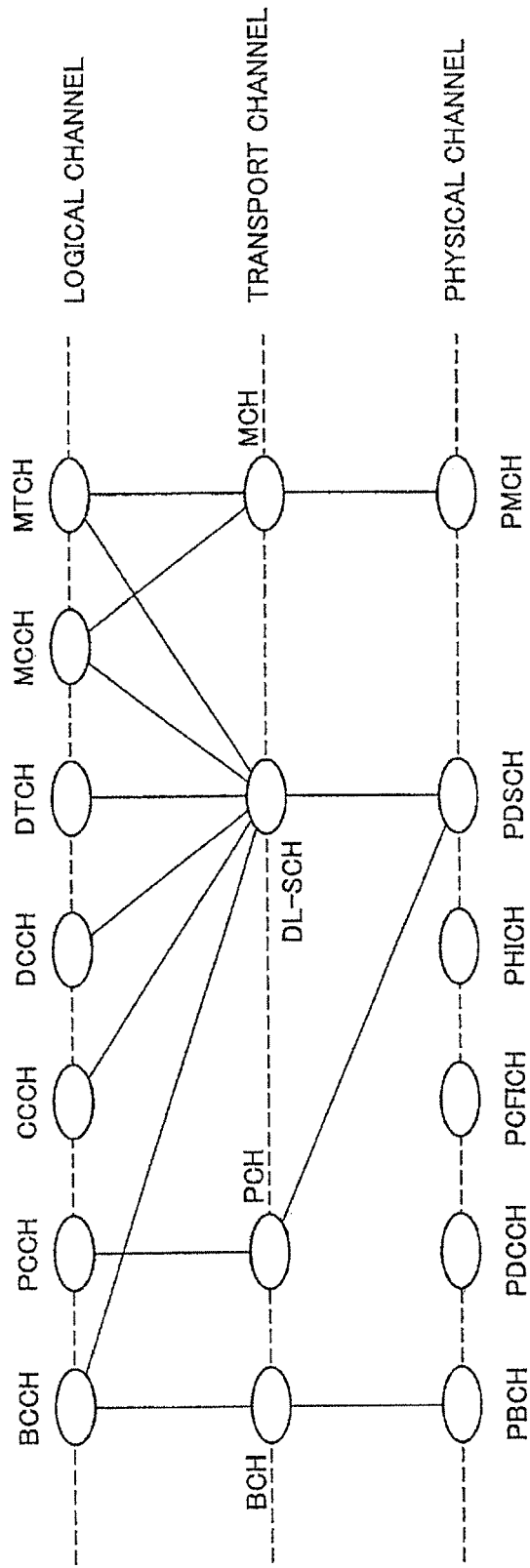
FIG. 1 is a diagram of a configuration of downlink channels used in a communication system according to a first embodiment of the present invention.

Embodiments of the present invention will now be described with reference to the drawings.

A first embodiment of the present invention will be described. A wireless communication system according to the first embodiment of the present invention includes, and performs wireless communication between, one or more base station apparatuses and one or more mobile station apparatuses. One base station apparatus configures one or more cells and one cell can contain one or more mobile station apparatuses.

<Regarding Measurement (Single Cell Communication)>

Measurement will then be described. The base station apparatus transmits a measurement configuration message to the mobile station apparatus by using an RRC connection reconfiguration (RRCConnectionReconfiguration) message of RRC signaling (radio resource control signal). The mobile station apparatus configures system information including in the measurement configuration message and performs the measurement, the event evaluation, and the measurement report for a serving cell and a neighboring cell (including a listed cell and/or detected cell) in accordance with the provided system information. The listed cell is a cell listed in a measurement object (cells in a neighboring cell list from the base station apparatus to the mobile station apparatus) and the detected cell is a cell detected by the mobile station apparatus on frequency indicated by a measurement object and not listed in the measurement object (cells detected by the mobile station apparatus itself and not in the neighboring cell list).

There are three types of measurement (intra-frequency measurements, inter-frequency measurements and inter-radio access technology measurements (inter-RAT measurements)). The intra-frequency measurements mean measurements at a downlink frequency of a serving cell (downlink frequency). The inter-frequency measurements mean measurements at a frequency different from the downlink frequency of the serving cell. The inter-radio access technology measurements (inter-RAT measurements) mean measurements with a wireless technology (e.g., UTRA, GERAN, or CDMA2000) different from the wireless technology of the serving cell (e.g., EUTRA).

The measurement configuration message includes addition and/or modification and/or deletion of configuration of a measurement identifier (measId), a measurement object and a reporting configuration as well as a quantity configuration (quantityConfig), a measurement gap configuration (measGapConfig), a serving cell quality threshold (s-Measure) and others.

<Quantity Configuration (quantityConfig)>

The quantity configuration (quantityConfig) specifies a third-layer filtering coefficient (L3 filtering coefficient) if the measurement object is EUTRA. The third-layer filtering coefficient (L3 filtering coefficient) prescribes a ratio (rate) between the latest measurement result and a previous filtering measurement result. The filtering result is utilized for the event evaluation in the mobile station apparatus.

<Measurement Gap Configuration (measGapConfig)>

The measurement gap configuration (measGapConfig) is utilized for controlling the configuration of a measurement gap pattern and the activation/deactivation of a measurement gap. The measurement gap configuration (measGapConfig) includes providing a gap pattern, a start system frame number (startSFN), and a start sub-frame number (startSubframeNumber) as information in the case of activating the measurement gap. The gap pattern prescribes which pattern is used as the measurement gap. The start system frame number (startSFN) prescribes SFN (System Frame Number) for starting the measurement gap. The start sub-frame number (startSubframeNumber) prescribes a sub-frame number for starting the measurement gap.

<Serving Cell Quality Threshold (s-Measure)>

The serving cell quality threshold (s-Measure) represents a threshold for quality of a serving cell and is utilized for controlling whether the mobile station apparatus needs to perform the measurement. The serving cell quality threshold (s-Measure) is configured as a value for a reference signal received power (RSRP).

<Measurement Identifier (measId)>

The measurement identifier (measId) is utilized for linking the measurement objects with the reporting configurations and specifically links a measurement object identifier (measObjectId) with a reporting configuration identifier (reportConfigId). The measurement identifier (measId) is corresponding to one measurement object identifier (measObjectId) and one reporting configuration identifier (reportConfigId). The measurement configuration message can be added/modified/deleted in terms of relationships with the measurement identifier (measId), the measurement object, and the reporting configuration.

MeasObjectToRemoveList is a command for deleting a specified measurement object identifier (measObjectId) and a measurement object corresponding to the specified measurement object identifier (measObjectId). In this case, all the measurement identifiers (measId) correlated with the specified measurement object identifier (measObjectId) are deleted. This command can specify a plurality of measurement object identifiers (measObjectId) at the same time.

MeasObjectToAddModifyList is a command for modifying a specified measurement object identifier (measObjectId) for a specified measurement object or for adding a specified measurement object identifier (measObjectId) and a specified measurement object. This command can specify a plurality of measurement object identifiers (measObjectId) at the same time.

ReportConfigToRemoveList is a command for deleting a specified reporting configuration identifier (reportConfigId) and a specified reporting configuration corresponding to the specified reporting configuration identifier (reportConfigId). In this case, all the measurement identifiers (measId) correlated with the specified reporting configuration identifier (reportConfigId) are deleted. This command can specify a plurality of reporting configuration identifiers (reportConfigId) at the same time.

ReportConfigToAddModifyList is a command for modifying a specified reporting configuration identifier (reportConfigId) for a specified reporting configuration or for adding a specified reporting configuration identifier (reportConfigId) and a specified reporting configuration. This command can specify a plurality of reporting configuration identifiers (reportConfigId) at the same time.

MeasIdToRemoveList is a command for deleting a specified measurement identifier (measId). In this case, the measurement object identifier (measObjectId) and the reporting configuration identifier (reportConfigId) correlated with the specified measurement identifier (measId) are not deleted and are maintained. This command can specify a plurality of measurement identifiers (measId) at the same time.

MeasIdToAddModifyList is a command for correlating a specified measurement identifier (measId) with a specified measurement object identifier (measObjectId) and a specified reporting configuration identifier (reportConfigId) or for correlating a specified measurement object identifier (measObjectId) and a specified reporting configuration identifier (reportConfigId) with a specified measurement identifier (measId) to add the specified measurement identifier (measId). This command can specify a plurality of measurement identifiers (measId) at the same time.

<Measurement Object>

The measurement object is prescribed for each radio access technology (RAT) and each frequency. The reporting configurations include prescriptions for EUTRA and prescriptions for RAT other than EUTRA.

The measurement objects include a measurement object EUTRA (measObjectEUTRA) correlated with a measurement object identifier (measObjectId).

The measurement object identifier (measObjectId) is an identifier used for identifying the configuration of the measurement object. The configuration of the measurement objects is prescribed for each radio access technology (RAT) and frequency as described above. The measurement objects are separately specified for EUTRAN, UTRA, GERAN, and CDMA2000. The measurement object EUTRA (measObjectEUTRA) is a measurement object for EUTRA and prescribes information applied to neighboring cells of EUTRA. A measurement object EUTRA (measObjectEUTRA) having a different frequency is handled as a different measurement object and is separately assigned with a measurement object identifier (measObjectId).

The measurement object EUTRA (measObjectEUTRA) includes EUTRA carrier frequency information (eutra-CarrierInfo), a measurement bandwidth (measurementBandwidth), an offset frequency (offsetFreq), information related to a neighboring cell list, and information related to a black list.

The information included in the measurement object EUTRA (measObjectEUTRA) will then be described. The EUTRA carrier frequency information (eutra-CarrierInfo) specifies a carrier frequency that is to be a measurement object. The measurement bandwidth (measurementBandwidth) indicates a measurement bandwidth common to all the neighboring cells operating in the carrier frequency defined as the measurement object. The offset frequency (offsetFreq) indicates a measurement offset value applied to the frequency defined as the measurement object.

The information related to a neighboring cell list includes information related to neighboring cells that are to be objects of the event evaluation and the measurement report. The information related to a neighboring cell list includes a physical cell identifier (physical cell ID), a cell individual offset (cellIndividualOffset; indicative of a measurement offset value applied to a neighboring cell) and others. In the case of EUTRA, this information is utilized as information for performing addition/modification or deletion in the neighboring cell list already acquired by the mobile station apparatus from the broadcast information (broadcasted system information).

The information related to a black list includes information related to neighboring cells that are not to be objects of the event evaluation and the measurement report. The information related to a black list includes a physical cell identifier (physical cell ID) and others. In the case of EUTRA, this information is utilized as information for performing addition/modification or deletion in a black cell list (black listed cell list) already acquired by the mobile station apparatus from the broadcast information.

<Reporting Configuration>

The reporting configuration includes reporting configuration EUTRA (reportConfigEUTRA) corresponding to a reporting configuration identifier (reportConfigId) and others.

The reporting configuration identifier (reportConfigId) is an identifier used for identifying the reporting configuration related to the measurements. The reporting configuration related to the measurements includes prescriptions for EUTRA and prescriptions for RAT other than EUTRA (UTRA, GERAN, CDMA2000) as described above. The reporting configuration EUTRA (reportConfigEUTRA) is the reporting configuration for EUTRA and defines triggering criteria of an event utilized for reporting the measurements in EUTRA.

The reporting configuration EUTRA (reportConfigEUTRA) includes an event identifier (eventId), a triggering quantity (triggerQuantity), hysteresis, a time to trigger (timeToTrigger), a report quantity (reportQuantity), a maximum reporting cell number (maxReportCells), a reporting interval (reportInterval), and a reporting amount (reportAmmount).

The reporting configuration EUTRA (reportConfigEUTRA) will then be described. The event identifier (eventId) is utilized for selecting criteria related to event triggered reporting. The event triggered reporting is a method of reporting the measurements when the event triggering criteria are satisfied. Event triggered periodic reporting also exists for reporting the measurements a certain number of times at regular intervals when the event triggering criteria are satisfied.

The event triggering criteria include five types as described later. If the event triggering criteria specified by the event identifier (eventId) are satisfied, the mobile station apparatus performs the measurement report to the base station apparatus. The triggering quantity (triggerQuantity) is a quantity utilized for evaluating the event triggering criteria. A reference signal received power (RSRP) or a reference signal received quality (RSRQ) is specified. The mobile station apparatus utilizes a quantity specified by the triggering quantity (triggerQuantity) to perform the measurements of a downlink reference signal and determines whether the event triggering criteria specified by the event identifier (eventId) are satisfied. The hysteresis is a parameter utilized in the event triggering criteria. The time to trigger (timeToTrigger) indicates a period while the event triggering criteria should be satisfied. The report quantity (reportQuantity) indicates a quantity reported in the measurement report. In this case, a quantity specified by the triggering quantity (triggerQuantity), or the reference signal received power (RSRP) and the reference signal received quality (RSRQ) are specified. The reference signal received quality (RSRQ) is a ratio represented by (N*RSRP)/(EUTRA carrier RSSI). The reception signal intensity (EUTRA carrier RSSI) indicates the intensity of total reception signal power and the measurement bandwidth is the same as the system bandwidth. N denotes the number of resource blocks (RB) related to the measurement bandwidth of the reception signal intensity (EUTRA carrier RSSI). The maximum reporting cell number (maxReportCells) indicates the maximum number of cells included in the measurement report. The reporting interval (reportInterval) is utilized for the periodical reporting or the event triggered periodic reporting and the reporting is periodically performed at intervals indicated by the reporting interval (reportInterval). The reporting amount (reportAmmount) prescribes the number of times of the periodical reporting as needed.

Threshold parameters and offset parameters (a1_Threshold, a2_Threshold, a3_Offset, a4_Threshold, a5_Threshold1, a5_Threshold2) utilized in the event triggering criteria are provided to the mobile station apparatus together with the event identifier (eventId) in the reporting configuration EUTRA (reportConfigEUTRA).

<Regarding Event Triggering Criteria>

The event triggering criteria for performing the measurement report are defined in the following five types, each having an entering condition and a leaving condition. Therefore, if a mobile station apparatus satisfies an entering condition for an event specified by the base station apparatus, the mobile station apparatus transmits a measurement report to the base station apparatus. On the other hand, if a mobile station apparatus satisfying an event of entering condition and transmitting a measurement report satisfies an event of leaving condition, the mobile station apparatus stops the transmission of the measurement report. The entering condition and the leaving condition for events are as follows:

<Event A1>
Event A1 entering condition: $Ms-Hys > a1\_Threshold$
Event A1 leaving condition: $Ms+Hys < a1\_Threshold$
<Event A2>
Event A2 entering condition: $Ms-Hys > a2\_Threshold$
Event A2 leaving condition: $Ms+Hys < a2\_Threshold$
<Event A3>
Event A3 entering condition: $Mn+Ofn+Ocn-Hys > Ms+Ofs+Ocs+a3\_Offset$
Event A3 leaving condition: $Mn+Ofn+Ocn+Hys < Ms+Ofs+Ocs+a3\_Offset$
<Event A4>
Event A4 entering condition: $Mn+Ofh+Ocn-Hys > a4\_Threshold$
Event A4 leaving condition: $Mn+Ofn+Ocn-Hys < a4\_Threshold$
<Event A5>
Event A5 entering condition: $Ms-Hys < a5\_Threshold1$, $Mn+Ofn+Ocn-Hys > a5\_Threshold2$
Event A5 leaving condition: $Ms+Hys > a5\_Threshold1$, $Mn+Ofn+Ocn+Hys < a5\_Threshold2$ Ms denotes a measurement result for a serving cell (without considering a measurement offset value specific to the cell). Mn denotes a measurement result for a neighboring cell. Hys is a hysteresis parameter for an event of interest.

Ofn denotes a frequency-specific measurement offset value for a frequency of a neighboring cell. Ofn corresponds to an offset frequency (offsetFreq) of the measurement object EUTRA (measObjectEUTRA). In the case of the intra-frequency measurements, Ofn is the same as Ofs. In the case of the inter-frequency measurements, Ofn is an offset frequency (offsetFreq) included in the measurement object EUTRA (measObjectEUTRA) corresponding to a downlink frequency different from the serving cell.

Ocn is a cell-specific measurement offset value for a neighboring cell. Ocn corresponds to a cell individual offset (cellIndividualOffset) of the measurement object EUTRA (measObjectEUTRA). If Ocn is not configured, the measurement offset value is configured to zero. In the case of the intra-frequency measurements, Ocn is a cell individual offset (cellIndividualOffset) included in the measurement object EUTRA (measObjectEUTRA) of the downlink frequency the same as the serving cell. In the case of the inter-frequency measurements, Ocn is a cell individual offset (cellIndividualOffset) included in the measurement object EUTRA (measObjectEUTRA) corresponding to a downlink frequency different from the serving cell.

Ofs is a frequency-specific offset value for a frequency of a serving cell. Ofs corresponds to an offset frequency (offsetFreq) of the measurement object EUTRA (measObjbectEUTRA).

Ocs is a cell-specific measurement offset value for the serving cell. Ocs is included in a cell individual offset (cellIndividualOffset) of the measurement object EUTRA (measObjectEUTRA) of the frequency of the serving cell.

The a1_Threshold is a threshold parameter utilized for the event A1. The a2_Threshold is a threshold parameter utilized for the event A2. The a3_Offset is an offset parameter utilized for the event A3. The a4_Threshold is a threshold parameter utilized for the event A4. The a5_Threshold1 and a5_Threshold2 are threshold parameters utilized for the event A5.

The mobile station generates the events in accordance with the measurement result Ms of the serving cell and the measurement result Mn of the neighboring cell. If the measurement result Ms of the serving cell is better than the threshold a1_Threshold after the application of the parameters, the event A1 is generated and, if worse than the threshold a2_Threshold, the event A2 is generated. If the measurement result Mn of the neighboring cell is better than the serving cell measurement result Ms and the offset a3_Offset after the application of the parameters, the event A3 is generated and, if the measurement result Mn of the neighboring cell is better than the threshold a4_Threshold after the application of the parameters, the event A4 is generated. If the measurement result Ms of the serving cell is worse than the threshold a5_Threshold1 after the application of the parameters and the measurement result Mn of the neighboring cell is better than the threshold a5_Threshold2 after the application of the parameters, the event A5 is generated.

The base station apparatus provides the serving cell quality threshold (s-Measure) in some cases and not in other cases. If the base station apparatus provides the serving cell quality threshold (s-Measure), the mobile station apparatus performs the measurements of a neighboring cell and the event evaluation (whether the event triggering criteria are satisfied; also known as the evaluation of reporting criteria) when the quality (RSRP value) of the serving cell is lower than the serving cell quality threshold (s-Measure). On the other hand, if the base station apparatus does not provide the serving cell quality threshold (s-Measure), the mobile station apparatus performs the measurements of a neighboring cell and the event evaluation regardless of the quality (RSRP value) of the serving cell.

<Regarding Measurement Result>

The mobile station apparatus satisfying the event triggering criteria transmits a measurement report to the base station apparatus. The measurement report includes a measurement result.

This measurement result comprises of a measurement identifier (measId), a serving cell measurement result (measResultServing) and a EUTRA measurement result list (measResultListEUTRA). The EUTRA measurement result list (measResultListEUTRA) includes a physical cell identifier (physicalCellIdentity) and a EUTRA cell measurement result (measResultEUTRA).

The measurement identifier (measId) is an identifier utilized for linking the measurement object identifier (measObjectId) and the reporting configuration identifier (reportConfigId) as described above. The serving cell measurement result (measResultServing) is a measurement result for a serving cell and reports the results of both the reference signal received power (RSRP) and the reference signal received quality (RSRQ) for the serving cell. A measurement result for a serving cell is always included in the measurement result. The physical cell identifier (physicalCellIdentity) is utilized for identifying a cell. The EUTRA cell measurement result (measResultEUTRA) is a measurement result for a EUTRA cell. A measurement result of a neighboring cell is included only when a relevant event is generated.

Figure 2:
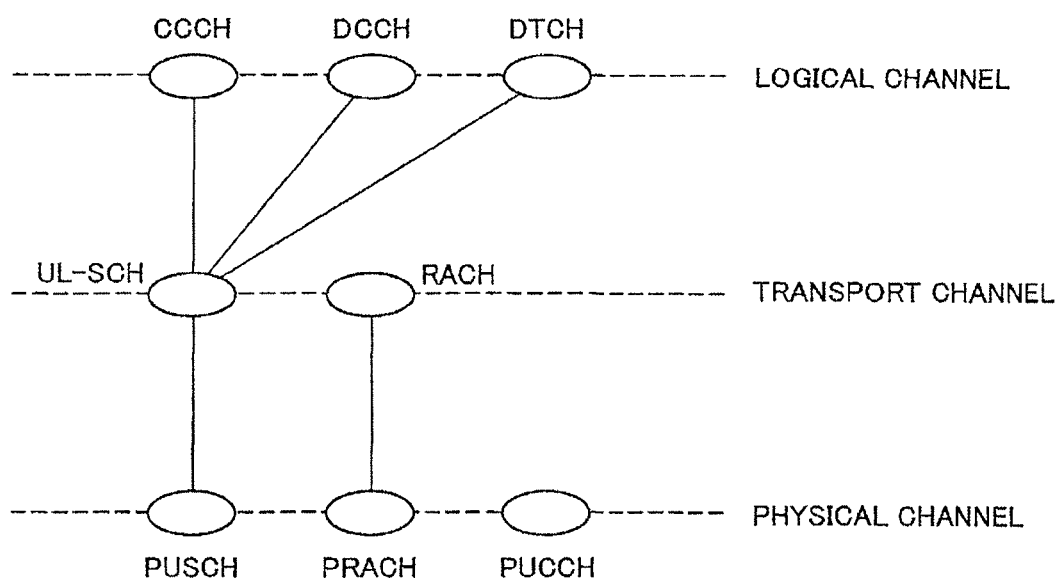
FIG. 2 is a diagram of a configuration of uplink channels used in the communication system according to the first embodiment of the present invention.

FIG. 1 is a diagram of a configuration of downlink channels used in a communication system according to a first embodiment of the present invention. FIG. 2 is a diagram of a configuration of uplink channels used in the communication system according to the first embodiment of the present invention. Both the downlink channels depicted in FIG. 1 and the uplink channels depicted in FIG. 2 comprise of logical channels, transport channels and physical channels.

The logical channels define types of data transmission services transmitted/received through a medium access control (MAC) layer. The transport channels define what characteristics the data transmitted by wireless interfaces have and how the data are transmitted. The physical channels are physical channels that carry the transport channels.

The downlink logical channels include a broadcast control channel (BCCH), a paging control channel (PCCH), a common control channel (CCCH), a dedicated control channel (DCCH), a dedicated traffic channel (DTCH), a multicast control channel (MCCH), and a multicast traffic channel (MTCH). The uplink logical channels include the common control channel (CCCH), the dedicated control channel (DCCH), and the dedicated traffic channel (DTCH).

The downlink transport channels include a broadcast channel (BCH), a paging channel (PCH), a downlink shared channel (DL-SCH), and a multicast channel (MCH). The uplink transport channels include an uplink shared channel (UL-SCH) and a random access channel (RACH).

The downlink physical channels include a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH). The uplink physical channels include a physical uplink shared channel (PUSCH), a physical random access channel (PRACH), and a physical uplink control channel (PUCCH).

Figure 20:
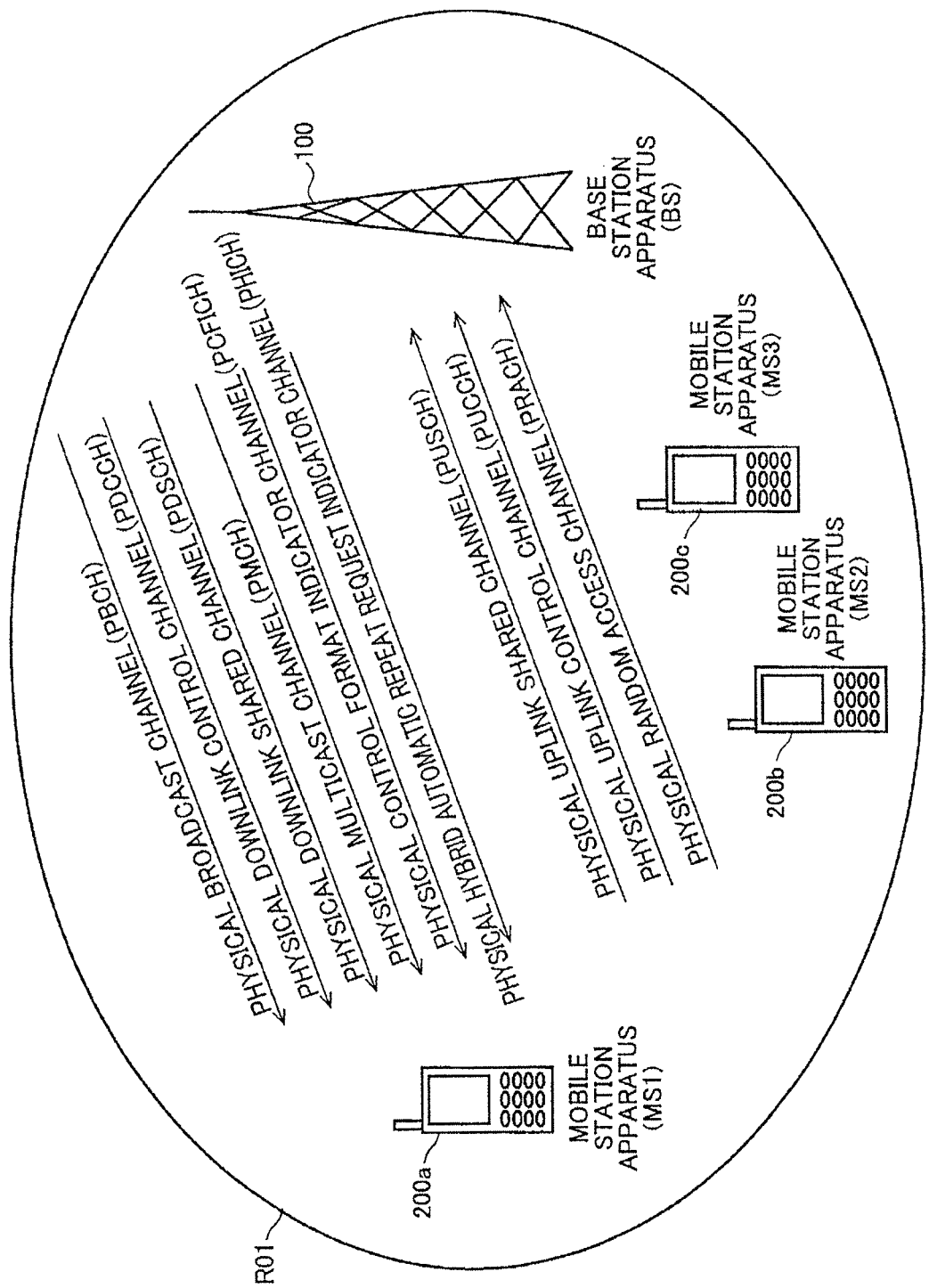
FIG. 20 is a diagram of a channel configuration used in a conventional wireless communication system.

These channels are transmitted/received between the base station apparatus and the mobile station apparatuses as depicted in FIG. 20 described in terms of a conventional technology.

The logical channels will then be described. The broadcast control channel (BCCH) is a downlink channel used for broadcasting the system information. The paging control channel (PCCH) is a downlink channel used for transmitting paging information and is used when a network does not know a cell position of a mobile station apparatus.

The common control channel (CCCH) is a channel used for transmitting control information between a mobile station apparatus and a network and is used by a mobile station apparatus not having radio resource control (RRC) connection with the network.

The dedicated control channel (DCCH) is a point-to-point bidirectional channel and is a channel utilized for transmitting individual control information between a mobile station apparatus and the network. The dedicated control channel (DCCH) is used by a mobile station apparatus having the RRC connection.

The dedicated traffic channel (DTCH) is a point-to-point bidirectional channel dedicated to one mobile station apparatus and is utilized for transferring user information (unicast data).

The multicast control channel (MCCH) is a downlink channel used for performing point-to-multipoint transmission of MBMS (multimedia broadcast multicast service) control information from a network to a mobile station apparatus. This is used in the MBMS service providing a service in a point-to-multipoint manner.

MBMS service transmitting methods include single-cell point-to-multipoint (SCPTM) transmission and multimedia broadcast multicast service single frequency network (MBSFN) transmission. The MBSFN transmission is a concurrent transmission technique realized by concurrently transmitting an identifiable waveform (signal) from a plurality of cells. On the other hand, the SCPTM transmission is a method of transmitting the MBMS service by one base station apparatus.

The multicast control channel (MCCH) is utilized for one or more multicast traffic channels (MTCH). The multicast traffic channel (MTCH) is a downlink channel used for performing point-to-multipoint transmission of traffic data from a network to a mobile station apparatus.

The multicast control channel (MCCH) and the multicast traffic channel (MTCH) are utilized only by a mobile station apparatus that receives MBMS.

The transport channels will be described. The broadcast channel (BCH) is broadcasted to the entire cell in accordance with a fixed and preliminarily defined transmission format. In the downlink shared channel (DL-SCH), HARQ (hybrid automatic repeat request), the dynamic adaptive radio link control, the non-contiguous reception (DRX), and the MBMS transmission are supported and need to be broadcasted to the entire cell.

In the downlink shared channel (DL-SCH), the beamforming can be utilized and dynamic resource allocation and semi-static resource allocation are supported. The paging channel (PCH) supports DRX and need to be broadcasted to the entire cell.

The paging channel (PCH) is mapped to a physical resource that is dynamically used for traffic channels or other control channels, i.e., the physical downlink shared channel (PUSCH).

The multicast channel (MCH) need to be broadcasted to the entire cell. The multicast channel (MCH) supports semi-static resource allocation such as MBSFN (MBMS single frequency network) combining of the MBMS transmission from a plurality of cells and a time frame using the extended cyclic prefix (CP).

The uplink shared channel (UL-SCH) supports HARQ and the dynamic adaptive radio link control. The uplink shared channel (UL-SCH) can utilize the beamforming. The dynamic resource allocation and the semi-static resource allocation are supported. The random access channel (RACH) transmits limited control information and has a risk of collision.

The physical channels will be described. The physical broadcast channel (PBCH) maps the broadcast channel (BCH) at intervals of 40 milliseconds. Blind detection is performed for the timing of 40 milliseconds. Therefore, explicit signaling may not be performed for the presentation of the timing. A sub-frame including the physical broadcast channel (PBCH) can be decoded by itself (self-decodable).

The physical downlink control channel (PDCCFI) is a channel used for notifying the mobile station apparatus of the resource allocation of the downlink shared channel (PDSCH), the hybrid automatic repeat request (HARQ) information for the downlink data, and the uplink transmission permission (uplink grant) that is the resource allocation of the physical uplink shared channel (PUSCH).

The physical downlink shared channel (PDSCH) is a channel used for transmitting the downlink data or the paging information. The physical multicast channel (PMCH) is a channel utilized for transmitting the multicast channel (MCH), and a downlink reference signal, an uplink reference signal, and a physical downlink synchronization signal are separately located.

The physical uplink shared channel (PUSCH) is a channel mainly used for transmitting the uplink data (UL-SCH). When the base station apparatus 100 schedules the mobile station apparatus 200, the physical uplink shared channel (PUSCH) is also used for transmitting a channel feedback report (a downlink channel quality indicator CQI, a precoding matrix indicator PMI, and a rank indicator RI) and HARQ acknowledgement (ACK)/negative acknowledgement (NACK) for downlink transmission.

The physical random access channel (PRACFI) is a channel used for transmitting a random access preamble and has a guard time. The physical uplink control channel (PUCCH) is a channel used for transmitting the channel feedback report (CQI, PMI, and RI), a scheduling request (SR), and HARQ acknowledgement/negative acknowledgement for downlink transmission.

The physical control format indicator channel (PCFICH) is a channel utilized for notifying the mobile station apparatus of an OFDM symbol number used for the physical downlink control channel (PDCCH) and transmitted in sub-frames.

The physical hybrid ARQ indicator channel (PHICH) is a channel utilized for transmitting HARQ ACK/NACK for uplink transmission.

The downlink reference signal (DL-RS) is a pilot signal transmitted with a predetermined power for each cell. The downlink reference signal is a signal periodically repeated at predetermined time intervals (e.g., one frame) and the mobile station apparatus receives the downlink reference signal at predetermined time intervals and measures the reception quality for the determination of the reception quality for each cell. The downlink reference signal is also used as a reference signal for demodulating the downlink data transmitted concurrently with the downlink reference signal. A sequence used for the downlink reference signal may be any sequence as long as a sequence is uniquely identifiable for each cell.

The channel mapping by the communication system according to the first embodiment of the present invention will be described.

As depicted in FIG. 1, the transport channels and the physical channels are mapped in the downlink as follows. The broadcast channel (BCH) is mapped to the physical broadcast channel (PBCH).

The multicast channel (MCH) is mapped to the physical multicast channel (PMCH). The paging channel (PCH) and the downlink shared channel (DL-SCH) are mapped to the physical downlink shared channel (PDSCH).

The physical downlink control channel (PDCCH), the physical hybrid ARQ indicator channel (PHICH), and the physical control format indicator channel (PCFICH) are independently used in the physical channels.

On the other hand, the transport channels and the physical channels are mapped in the uplink as follows. The uplink shared channel (UL-SCH) is mapped to the physical uplink shared channel (PDSCH).

The random access channel (RACH) is mapped to the physical random access channel (PRACH). The physical uplink control channel (PUCCH) is independently used in the physical channels.

The logical channels and the transport channels are mapped in the downlink as follows. The paging control channel (PCCH) is mapped to the paging channel (PCH).

The broadcast control channel (BCCH) is mapped to the broadcast channel (BCH) and the downlink shared channel (DL-SCH). The common control channel (CCCH), the dedicated control channel (DCCH), and the dedicated traffic channel (DTCH) are mapped to the downlink shared channel (DL-SCH).

The multicast control channel (MCCH) is mapped to the downlink shared channel (DL-SCH) and the multicast channel (MCH). The multicast traffic channel (MTCH) is mapped to the downlink shared channel (DL-SCH) and the multicast channel (MCH).

The mapping from the multicast control channel (MCCH) and the multicast traffic channel (MTCH) to the multicast channel (MCH) is performed at the time of the MBSFN transmission while these channels are mapped to the downlink shared channel (DL-SCH) at the time of the SCPTM transmission.

On the other hand, the logical channels and the transport channels are mapped in the uplink as follows. The common control channel (CCCH), the dedicated control channel (DCCH), and the dedicated traffic channel (DTCH) are mapped to the uplink shared channel (UL-SCH). The random access channel (RACH) is not mapped to a logical channel.

Figure 4:
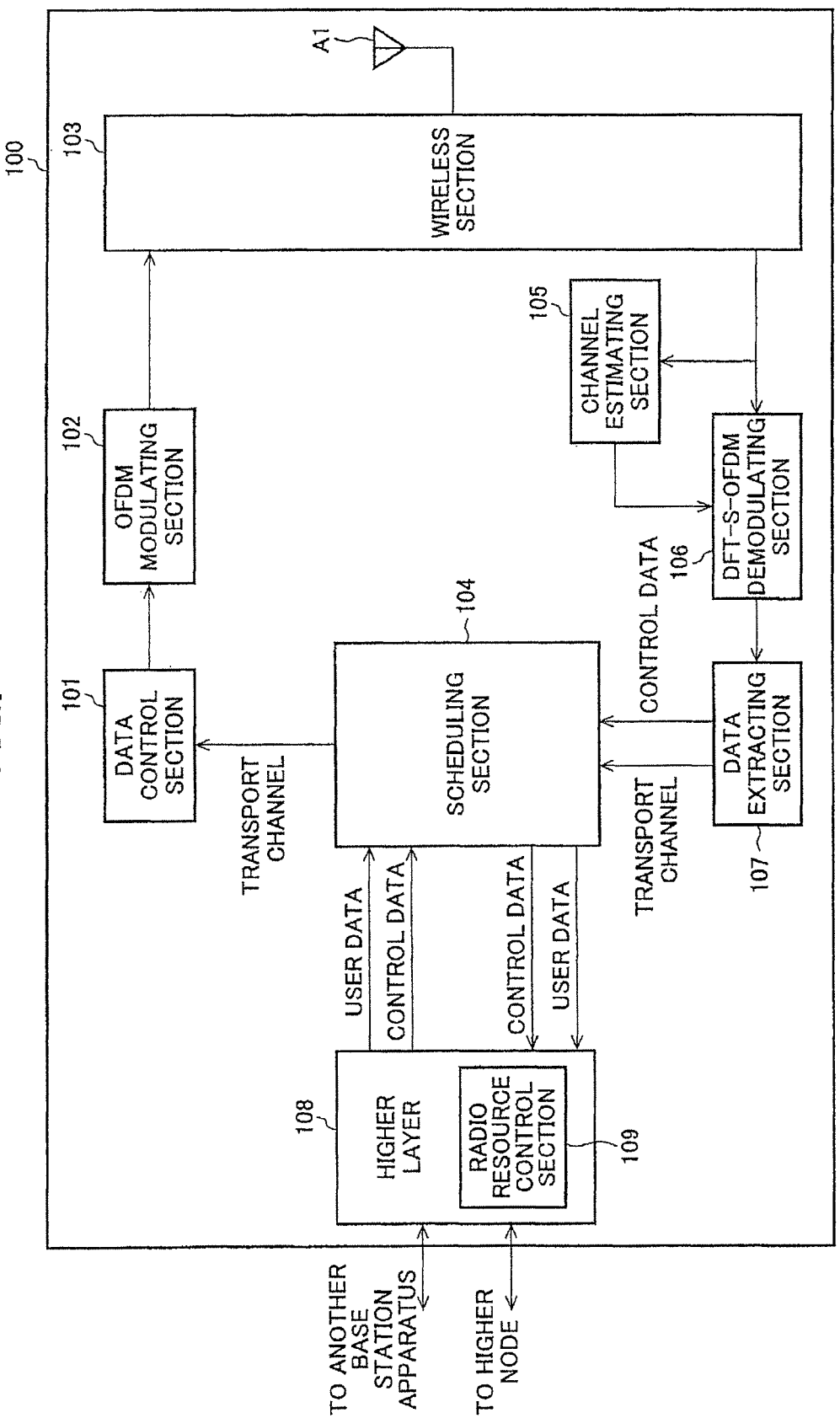
FIG. 4 is a general block diagram of a configuration of a base station apparatus according to the first embodiment of the present invention.

FIG. 4 is a general block diagram of a configuration of the base station apparatus 100 according to the first embodiment of the present invention. The base station apparatus 100 includes a data control section 101, an OFDM modulating section 102, a wireless section 103, a scheduling section 104, a channel estimating section 105, a DFT-S-OFDM (DFT-Spread-OFDM) demodulating section 106, a data extracting section 107, a higher layer 108, and an antenna section A1.

A receiving section comprises of the wireless section 103, the scheduling section 104, the channel estimating section 105, the DFT-S-OFDM demodulating section 106, the data extracting section 107, the higher layer 108, and the antenna section A1. A transmitting section comprises of the data control section 101, the OFDM modulating section 102, the wireless section 103, the scheduling section 104, the higher layer 108, and the antenna section A1. Some part of the respective receiving section and transmitting section is configured to separately execute processing for each component carrier and some other part is configured to execute processing common to component carriers.

The antenna section A1, the wireless section 103, the channel estimating section 105, the DFT-S-OFDM demodulating section 106, and the data extracting section 107 execute processing for an uplink physical layer. The antenna section A2, the data control section 101, the OFDM modulating section 102, and the wireless section 103 execute processing for a downlink physical layer.

The data control section 101 acquires the transport channels from the scheduling section 104. The data control section 101 maps the transport channels as well as signals and channels generated in the physical layer based on the scheduling information input from the scheduling section 104, to the physical channels based on the scheduling information input from the scheduling section 104. The data mapped as described above are output to the OFDM modulating section 102.

The OFDM modulating section 102 executes the encoding, the data modulation, the input signal serial/parallel conversion, the IFFT (Inverse Fast Fourier Transform) processing, and the insertion of cyclic prefix (CP) as well as the OFDM signal processing such as filtering for the data input from the data control section 101 to generate and output an OFDM signal to the wireless section 103 based on the scheduling information input from the scheduling section 104 (including downlink physical resource block (PRB) allocation information (e.g., physical resource block position information such as frequency and time), and a modulation method and an encoding method corresponding to each downlink physical resource block (PRB) (e.g., 16QAM modulation, 2/3 coding rate)).

The wireless section 103 up-converts the modulated data input from the OFDM modulating section 102 to a radio frequency to generate and transmit a radio signal to the mobile station apparatus 200 via the antenna section A1. The wireless section 103 receives an uplink radio signal from the mobile station apparatus 200 via the antenna section A1 and down-converts the signal to a baseband signal to output the reception data to the channel estimating section 105 and the DFT-S-OFDM demodulating section 106.

The scheduling section 104 executes processing for a medium access control (MAC) layer. The scheduling section 104 performs the mapping of the logical channels and the transport channels, the scheduling of the downlink and the uplink (such as HARQ processing and selection of a transport format) and others. Since the scheduling section 104 integrates to control the processing sections of the physical layers, interfaces exist between the scheduling section 104 and the antenna section A1, the wireless section 103, the channel estimating section 105, the DFT-S-OFDM demodulating section 106, the data control section 101, the OFDM modulating section 102, and the data extracting section 107. However, the interfaces are not depicted.

In the scheduling of the downlink, the scheduling section 104 executes the selection processing of a downlink transport format (transmission form) for modulating data (allocation of physical resource blocks (PRB) and a modulating method and an encoding method) and the generation of the scheduling information used in the retransmission control in HARQ and the downlink scheduling, based on feedback information received from the mobile station apparatus 200 (a downlink channel feedback report (channel quality (CQI), the number of streams (RI), precoding information (PMI) and others.) and ACK/NACK feedback information for downlink data), the information of available downlink physical resource blocks (PRB) of the mobile station apparatuses, a buffer status, the scheduling information input from the higher layer 108 and others. The scheduling information used for the downlink scheduling is output to the data control section 101 and the data extracting section 107.

In the scheduling of the uplink, the scheduling section 104 executes the selection processing of an uplink transport format (transmission form) for modulating data (allocation of physical resource blocks (PRB) and a modulating method and an encoding method) and the generation of the scheduling information used in the uplink scheduling, based on an estimation result of an uplink channel state (wireless propagation channel state) output by the channel estimating section 105, a resource allocation request from the mobile station apparatus 200, information of available downlink physical resource blocks (PRB) of the mobile station apparatuses 200, the scheduling information input from the higher layer 108 and others.

The scheduling information used for the uplink scheduling is output to the data control section 101 and the data extracting section 107.

The scheduling section 104 maps the downlink logical channels input from the higher layer 108 to the transport channels before output to the data control section 101. The scheduling section 104 processes the control data acquired through the uplink and the transport channels input from the data extracting section 107 as needed and maps the control data and the transport channels to the uplink logical channels and outputs them to the higher layer 108.

The channel estimating section 105 estimates an uplink channel state from an uplink demodulation reference signal (DRS) for the demodulation of uplink data and outputs the estimation result to the DFT-S-OFDM demodulating section 106. The channel estimating section 105 also estimates an uplink channel state from an uplink sounding reference signal (SRS) for scheduling the uplink and outputs the estimation result to the scheduling section 104.

Although it is assumed that the communication method of the uplink is using a single carrier method such as DFT-S-OFDM, a multicarrier method such as OFDM method may also be used.

Based on the uplink channel state estimation result input from the channel estimating section 105, the DFT-S-OFDM demodulating section 106 executes DFT-S-OFDM signal processing such as DFT (Discrete Fourier Transform) transform, sub-carrier mapping, IFFT transform, and filtering for the modulated data input from the wireless section 103 to execute the demodulation processing before output to the data extracting section 107.

The data extracting section 107 checks the correctness of the data input from the DFT-S-OFDM demodulating section 106 based on the scheduling information from the scheduling section 104 and outputs the check result (acknowledgement signal ACK/negative acknowledgement signal NACK) to the scheduling section 104.

The data extracting section 107 divides the data input from the DFT-S-OFDM demodulating section 106 into the transport channels and the physical layer control data based on the scheduling information from the scheduling section 104 and outputs them to the scheduling section 104.

The divided control data includes the feedback information (downlink channel feedback report (CQI, PMI, RI), ACK/NACK feedback information for downlink data) provided from the mobile station apparatus 200.

The higher layer 108 executes each processing for a packet data convergence protocol (PDCP) layer, a radio link control (RLC) layer, and a radio resource control (RRC) layer. Since the higher layer 108 integrates to control the processing sections of the lower layers, interfaces exist between the higher layer 108 and the scheduling section 104, the antenna section A1, the wireless section 103, the channel estimating section 105, the DFT-S-OFDM demodulating section 106, the data control section 101, the OFDM modulating section 102, and the data extracting section 107. However, the interfaces are not depicted.

The higher layer 108 includes a radio resource control section 109. The radio resource control section 109 performs management of various parts of configuration information, management of system information, management of measurement configuration and measurement result, paging control, management of communication states of mobile station apparatuses, management of migration such as handover, management of buffer status for each mobile station apparatus, management of connection setup of unicast and multicast bearers, management of mobile station identifier (UEID) and others. The higher layer 108 gives/receives information to/from another base station apparatus and information to/from a higher node.

Figure 5:
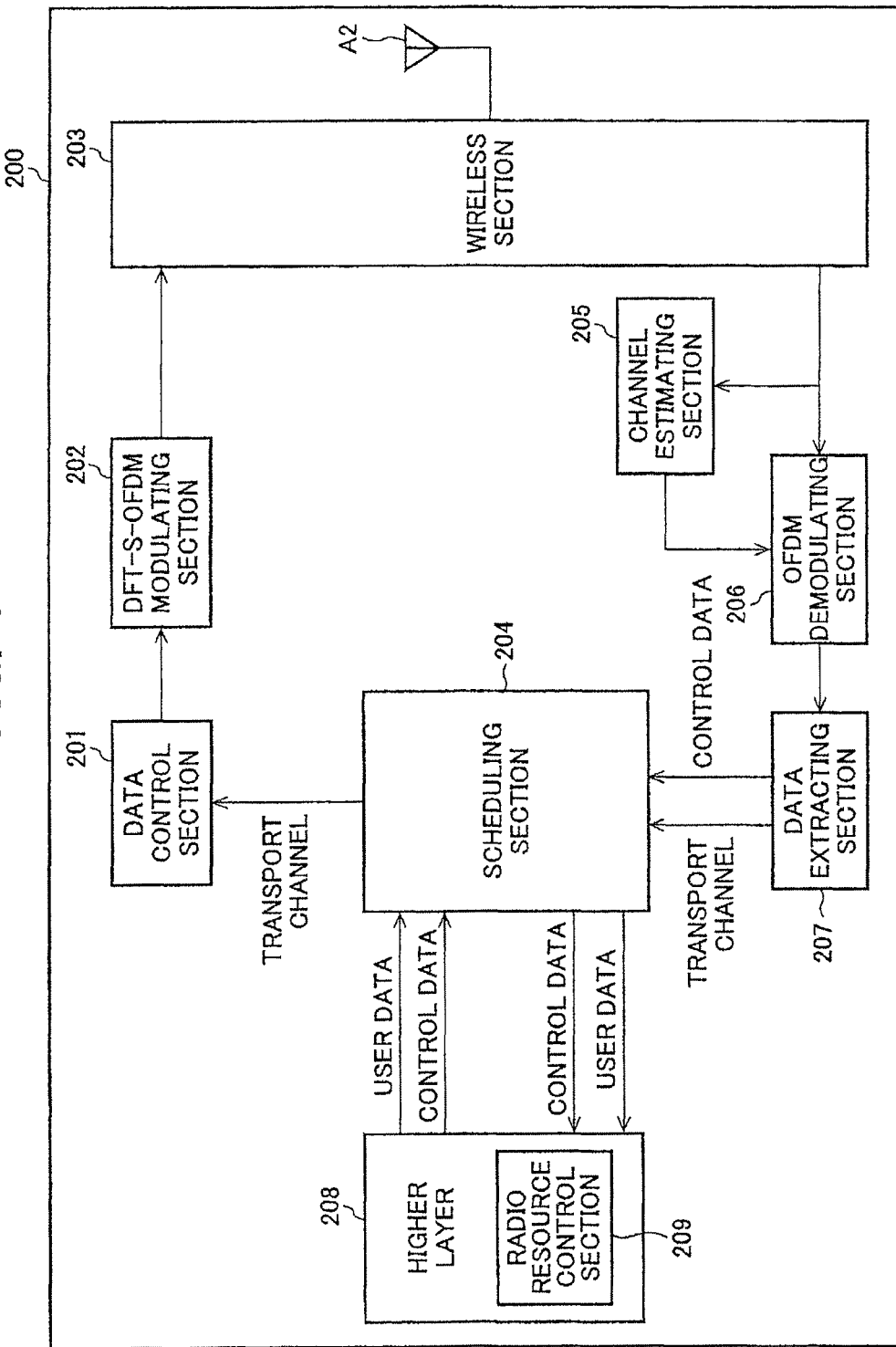
FIG. 5 is a general block diagram of a configuration of a mobile station apparatus according to the first embodiment of the present invention.

FIG. 5 is a general block diagram of a configuration of the mobile station apparatus 200 according to the first embodiment of the present invention. The mobile station apparatus 200 includes a data control section 201, a DFT-S-OFDM modulating section 202, a wireless section 203, a scheduling section 204, a channel estimating section 205, an OFDM demodulating section 206, a data extracting section 207, a higher layer 208, and an antenna section A2.

A transmitting section comprises of the data control section 201, the DFT-S-OFDM modulating section 202, the wireless section 203, the scheduling section 204, the higher layer 208, and the antenna section A2. A receiving section comprises of the wireless section 203, the scheduling section 204, the channel estimating section 205, the OFDM demodulating section 206, the data extracting section 207, the higher layer 208, and the antenna section A2. A selecting section comprises of the scheduling section 204.

The antenna section A2, the data control section 201, the DFT-S-OFDM modulating section 202, and the wireless section 203 execute processing for the uplink physical layer. The antenna section A2, the wireless section 203, the channel estimating section 205, the OFDM demodulating section 206, and the data extracting section 207 execute processing for the downlink physical layer. Some part of the respective transmitting section and receiving section is configured to separately execute processing for each component carrier and some other part is configured to execute common processing common to component carriers.

The data control section 201 acquires the transport channels from the scheduling section 204. The data control section 201 maps the transport channels as well as signals and channels generated in the physical layer based on the scheduling information input from the scheduling section 204, to the physical channels based on the scheduling information input from the scheduling section 204. The data mapped as described above are output to the DFT-S-OFDM modulating section 202.

The DFT-S-OFDM modulating section 202 executes DFT-S-OFDM signal processing such as data modulation, DFT processing, sub-carrier mapping, IFFT (Inverse Fast Fourier Transform) processing, insertion of cyclic prefix (CP), and filtering for the data input from the data control section 201 to generate and output a DFT-S-OFDM signal to the wireless section 203.

Although it is assumed that the communication method of the uplink is using a single carrier method such as DFT-S-OFDM, a multicarrier method such as OFDM method may also be used.

The wireless section 203 up-converts the modulated data input from the DFT-S-OFDM modulating section 202 to a radio frequency to generate and transmit a radio signal to the base station apparatus 100 via the antenna section A2.

The wireless section 203 receives a radio signal modulated by the downlink data from the base station apparatus 100 via the antenna section A2 and down-converts the modulated signal to a baseband signal and outputs the reception data to the channel estimating section 205 and the OFDM demodulating section 206.

The scheduling section 204 executes processing for the medium access control layer. The scheduling section 104 performs the mapping of the logical channels and the transport channels, the scheduling of the downlink and the uplink (such as HARQ processing and selection of transport format) and others. Since the scheduling section 204 integrates to control the processing sections of the physical layers, interfaces exist between the scheduling section 204 and the antenna section A2, the data control section 201, the DFT-S-OFDM modulating section 202, the channel estimating section 205, the OFDM demodulating section 206, the data extracting section 207, and the wireless section 203. However, the interfaces are not depicted.

In the scheduling of the downlink, the scheduling section 204 executes the generation of the scheduling information used in the reception control of the transport channels and the physical signals and physical channels, the HARQ retransmission control, and the downlink scheduling, based on the scheduling information from the base station apparatus 100 and the higher layer 208 (the transport format and the HARQ retransmission information). The scheduling information used for the downlink scheduling is output to the data control section 201 and the data extracting section 207.

In the scheduling of the uplink, the scheduling section 204 executes the generation of the scheduling information used in the scheduling processing for mapping the uplink logical channels input from the higher layer 208 to the transport channels and the uplink scheduling, based on the uplink buffer status input from the higher layer 208, the uplink scheduling information from the base station apparatus 100 input from the data extracting section 207 (the transport format and the HARQ retransmission information), and the scheduling information input from the higher layer 208.

For the uplink transport format, the information provided from the base station apparatus 100 is utilized. The scheduling information is output to the data control section 201 and the data extracting section 207.

The scheduling section 204 maps the uplink logical channels input from the higher layer 208 to the transport channels and outputs them to the data control section 201. The scheduling section 204 also outputs to the data control section 201 the downlink channel feedback report (CQI, PMI, RI) input from the channel estimating section 205 and the CRC confirmation result input from the data extracting section 207.

The scheduling section 204 processes the control data acquired through the downlink and the transport channels input from the data extracting section 207 as needed and maps the control data and the transport channels to the downlink logical channels and outputs them to the higher layer 208.

The channel estimating section 205 estimates a downlink channel state from a downlink reference signal (RS) for the demodulation of downlink data and outputs the estimation result to the OFDM demodulating section 206.

The channel estimating section 205 also estimates a downlink channel state from the downlink reference signal (RS) for notifying the base station apparatus 100 of the downlink channel state (wireless propagation channel state) and converts the estimation result into the down link channel feedback report (such as channel quality information) to output to the scheduling section 204. The channel estimating section 205 outputs the measurement result of the downlink reference signal (RS) to a radio resource control section 209 in order to notify the base station apparatus 100 of the downlink measurement result.

The OFDM demodulating section 206 executes the OFDM demodulation processing for the modulated data input from the wireless section 203 based on the downlink channel state estimation result input from the channel estimating section 205 and outputs the data to the data extracting section 207.

The data extracting section 207 performs the cyclic redundancy check (CRC) for the data input from the OFDM demodulating section 206 to check the correctness and outputs the check result (ACK/NACK feedback information) to the scheduling section 204.

The data extracting section 207 divides the data input from the OFDM demodulating section 206 into the transport channels and the physical layer control data based on the scheduling information from the scheduling section 204 and output them to the scheduling section 204. The divided control data includes the scheduling information such as downlink or uplink resource allocation and uplink HARQ control information. In this case, a decoding processing is executed for the search space (also called search area) of the physical downlink control signal (PDCCH) to extract the downlink or uplink resource allocation intended for its own mobile station apparatus.

The higher layer 208 executes each processing for the packet data convergence protocol (PDCP) layer, the radio link control (RLC) layer, and the radio resource control (RRC) layer. The higher layer 208 includes the radio resource control section 209. Since the higher layer 208 integrates to control the processing sections of the lower layers, interfaces exist between the higher layer 208 and the scheduling section 204, the antenna section A2, the data control section 201, the DFT-S-OFDM modulating section 202, the channel estimating section 205, the OFDM demodulating section 206, the data extracting section 207, and the wireless section 203. However, the interfaces are not depicted.

The radio resource control section 209 performs management of various parts of configuration information, management of system information, management of measurement configuration and measurement result, paging control, management of communication states of its own mobile station apparatus, management of migration such as handover, management of buffer status, management of connection setup of unicast and multicast bearers, and management of mobile station identifier (UEID).

Figure 3:
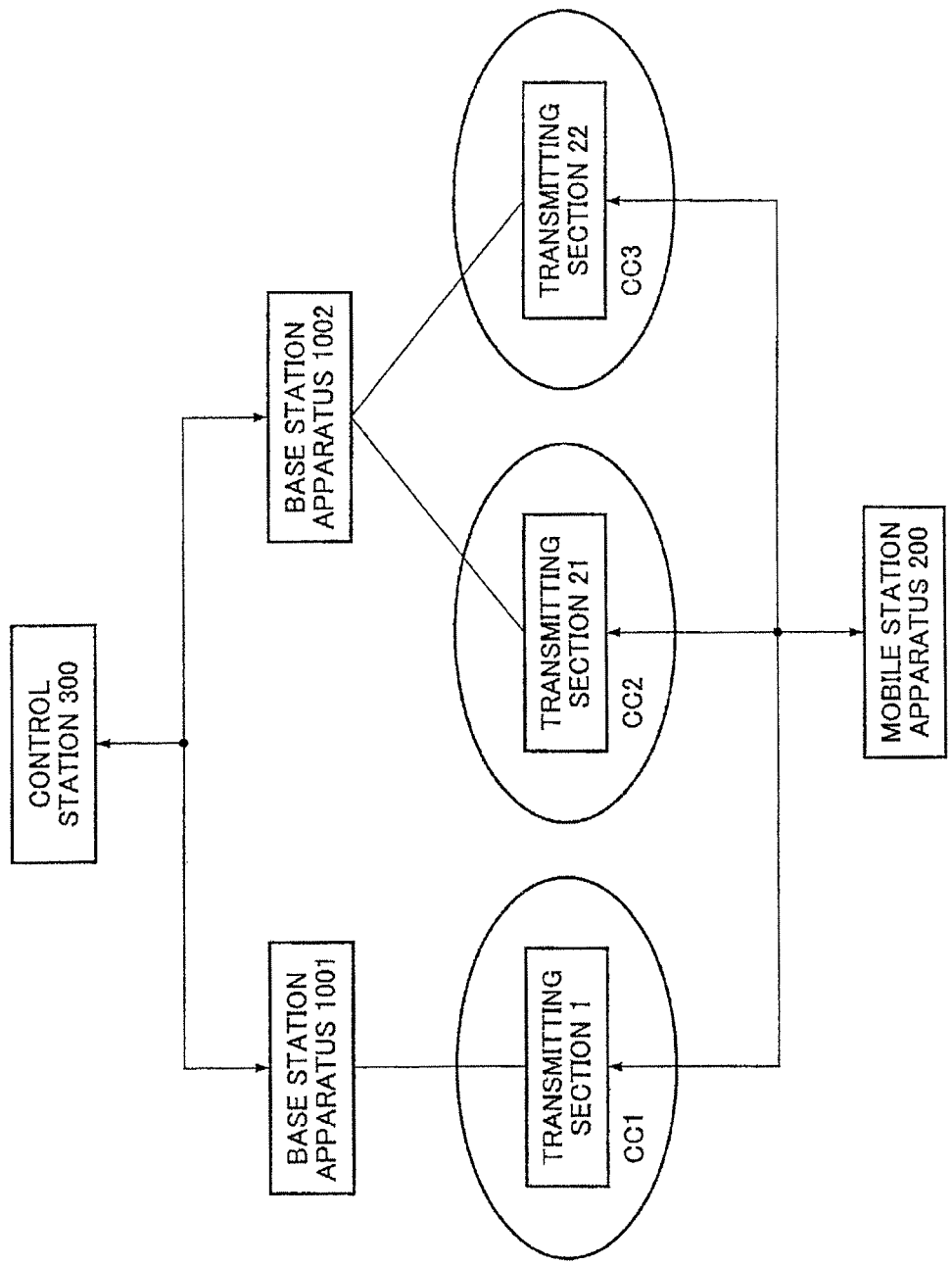
FIG. 3 is a diagram of an example of a network configuration according to the first embodiment of the present invention.

FIG. 3 is a diagram of an example of a network configuration of the present invention. In case the mobile station apparatus 200 is able to perform simultaneous communications using a plurality of frequency layers (component carrier CC1 to component carrier CC3) by the carrier aggregation, it is conceivable that the mobile station apparatus 200 uses a network configuration having one certain base station apparatus 1002 including a transmitting section 21 and a transmitting section 22 for a plurality of downlink frequency layers (CC2 and CC3) or having one base station apparatus 1001 including one transmitting section 11 for each frequency layer (CC1) and the both cases may be mixed; however, this embodiment can be implemented in any configuration without problem. The transmitting section 21 and the transmitting section 22 may comprise of one transmitting section. It is also conceivable in the uplink that one base station apparatus includes a receiving section for each of a plurality of uplink frequency layers and that one base station apparatus has one receiving section for each frequency layer, and the both cases may be mixed. The base station apparatuses 1001, 1002 may be managed by a higher control station 300 or the collaborative control may be achieved between the base station apparatus 1001 and the base station apparatus 1002. The mobile station apparatus 200 recognizes component carriers as cells without paying any special attention to which base station apparatus transmits a downlink component carrier and which base station apparatus receives an uplink component carrier. The mobile station apparatus 200 acquires the system information such as a frequency band and a bandwidth of a corresponding uplink component carrier from the system information broadcasted in each cell. Since the addition of a component carrier (carrier aggregation) to the mobile station apparatus 200 is performed by a dedicated signal (such as RRC signaling), a component carrier specific to the mobile station apparatus can be configured.

The mobile station apparatus manages a system information field that is content of the system information and a system information element (IE) comprises of one or more system information fields. These parts of the system information (including the system information fields and the system information elements) are managed by RRC of the mobile station apparatus and the base station apparatus for each component carrier. The system information is configuration information parameters managed by the system that performs communications between the mobile station apparatus and the base station apparatus and also the system information is parameters necessary for the mobile station apparatus to operate in the system. The system information includes a measurement configuration, a measurement identifier (measId), a measurement object, a reporting configuration and others.

The system information managed by RRC is broadcasted through the broadcast control channel (BCCH) or provided from the base station apparatus to the mobile station apparatus through the RRC signaling by the common control channel (CCCH) and/or the dedicated control channel (DCCH).

The system information managed by RRC is managed as a different parameter for each component carrier (specific to each component carrier).

When the system information is provided by the RRC signaling, a new RRC message type may be prepared for each part of the system information in such a way that the system information is provided by specifying an identification number of a component carrier, or an RRC connection reconfiguration (RRCConnectionReconfiguration) message may be extended such that the RRC connection reconfiguration (RRCConnectionReconfiguration) message can be provided by specifying an identification number of a component carrier. A physical cell identifier (physicalCellIdentity) and a corresponding frequency may be reused for an identification number of a component carrier.

When the broadcast control channel (BCCH) is used for providing the system information by SIB (SystemInformationBlock) (aggregation of a plurality of parts of information transmitted in the same transmission cycle), the system information is provided by specifying an identification number of a component carrier to which the system information is applied. Alternatively, a component carrier located with SIB which provides the system information may be defined as the component carrier to which the system information is applied.

The mobile station apparatus manages the system information of one or more component carriers with a bandwidth of a section of the system band and, when a component carrier is added to the mobile station apparatus, the mobile station apparatus applies the system information of the currently accessing component carrier to the added component carrier. For the system information not provided as the system information applied to the added component carrier when the component carrier is added to the mobile station apparatus, the mobile station apparatus applies the system information of the currently accessing component carrier to the added component carrier. For predetermined certain system information, the mobile station apparatus applies the system information of the currently accessing component carrier to the added component carrier when the component carrier is added to the mobile station apparatus. For predetermined certain system information, the mobile station apparatus applies the system information having a default value (initial value) to the added component carrier when component carrier is added to the mobile station apparatus.

The addition of a component carrier (carrier aggregation) can conceptually be considered as addition of an active component carrier (cell) or activation of a component carrier (cell). The active component carriers (cells) are referred to as active set cells or active set component carriers. The active set cells include cells (or component carriers) of the same and different frequency layers.

When acquiring the information related to the addition of a component carrier, the mobile station apparatus 200 adjusts the wireless section 203 so as to receive the added component carrier.

A method of measurement of the mobile station apparatus will then be described in the case of communication using a plurality of cells (component carriers).

<First interpretation of Serving Cell>

Figure 6:
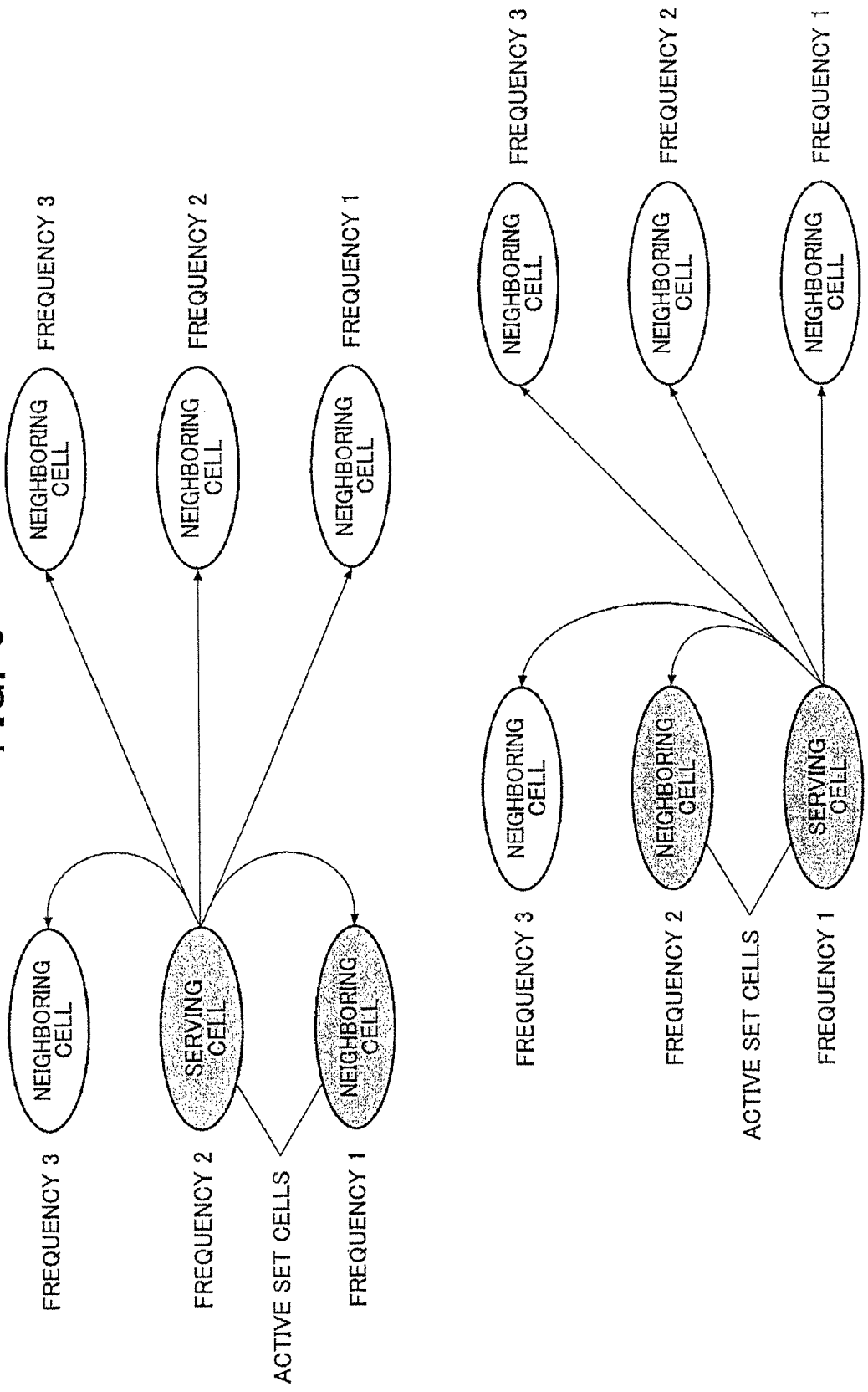
FIG. 6 is a diagram of an example of a serving cell according to the first embodiment of the present invention.

An example of concept of the serving cell (first interpretation of the serving cell) will be described with reference to FIG. 6. The mobile station apparatus and the base station apparatus consider each of active component carriers as a serving cell (serving cells). Neighboring cells are cells other than the serving cell when one cell of the active set cells is considered as the serving cell. Therefore, a cell in an active set may be considered as a neighboring cell depending on which cell is considered as a serving cell. This leads to an extension of the concept of the serving cell and, therefore, the configuration related to the measurements of a plurality of frequency layers can efficiently be performed. The measurements between cells within an active set can be considered as measurements of a serving cell and a neighboring cell at the time of the measurements. The configurations of the serving cell and the neighboring cell which are configured in each cell can directly be applied.

<Second interpretation of Serving Cell>

Figure 7:
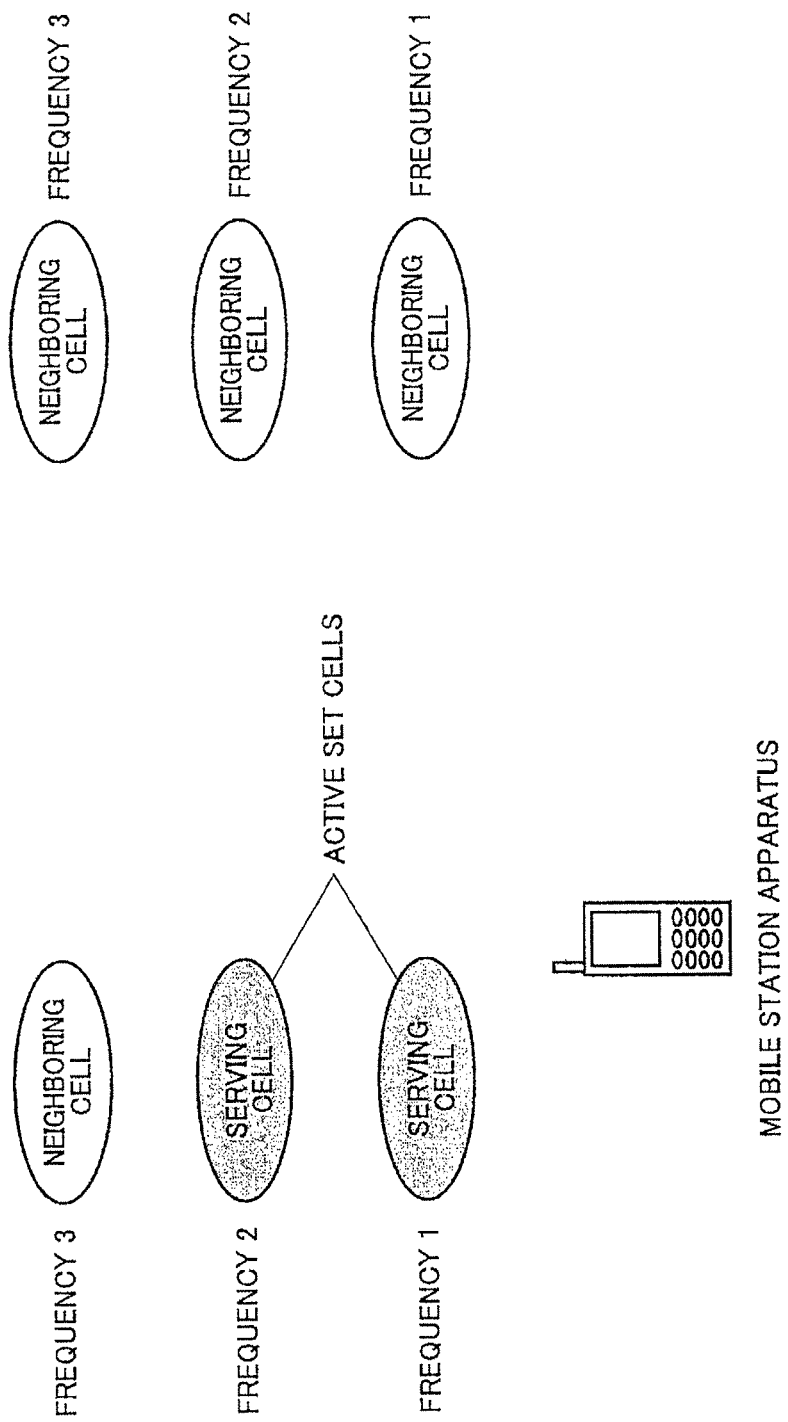
FIG. 7 is another diagram of an example of a serving cell according to the first embodiment of the present invention.

Another example of concept of the serving cell (second interpretation of the serving cell) will be described with reference to FIG. 7. The mobile station apparatus and the base station apparatus consider all the active component carriers as serving cells. The neighboring cells are cells that are not configured in the active set cells. This leads to an extension of the concept of the serving cell and, therefore, the configuration related to measurements of a plurality of frequency layers can efficiently be performed. The cells within the active set cells can be omitted from the neighboring cells to be measured at the time of the measurements. The configurations of the serving cell and the neighboring cell that are configured in each cell can directly be applied.

<Interpretation of Inter-Frequency Measurements>

Figure 8:
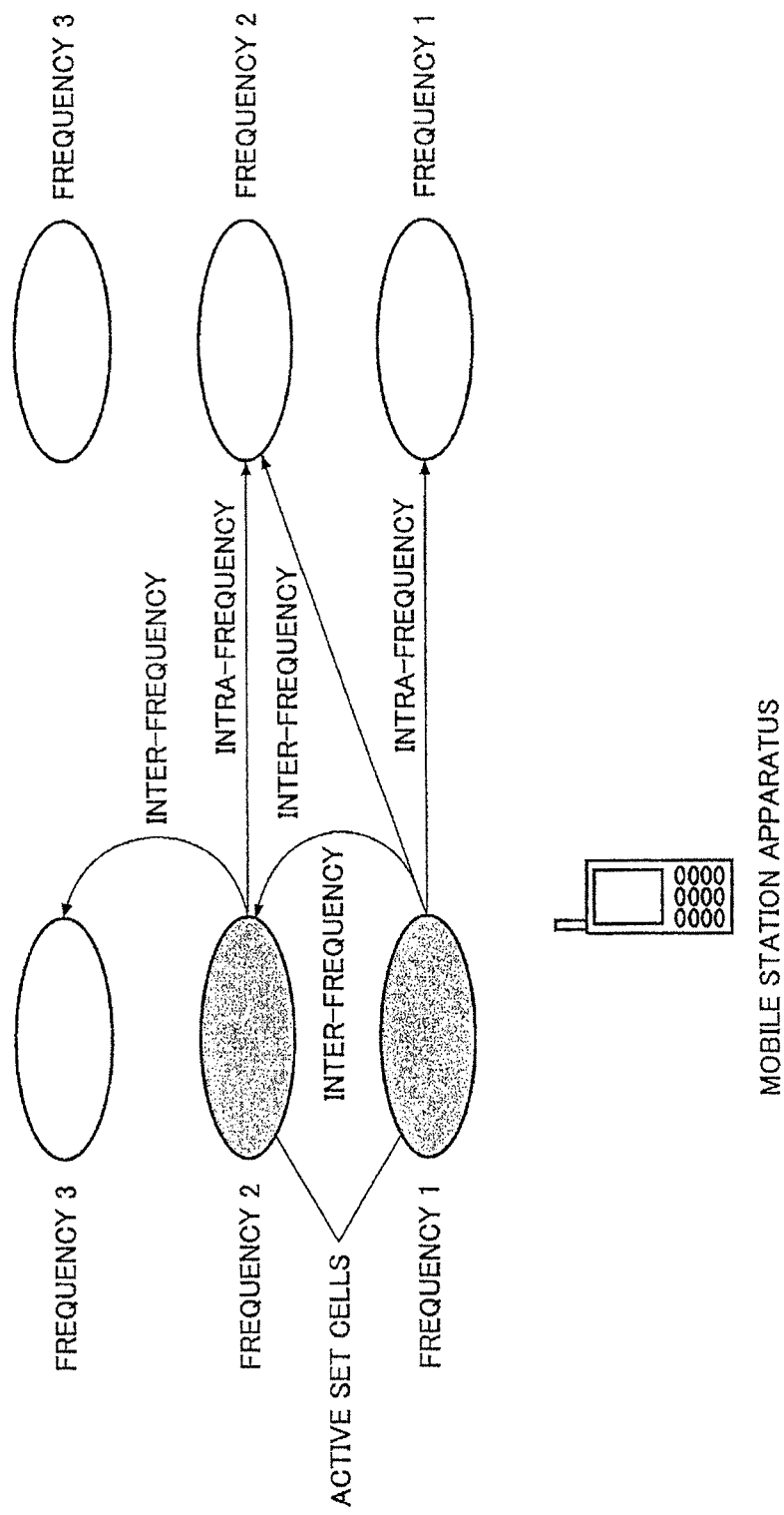
FIG. 8 is a diagram of an example of inter-frequency measurement and intra-frequency measurement according to the first embodiment of the present invention.

The definition of the intra-frequency measurements and the inter-frequency measurements when the active set cells are configured are described with reference to FIG. 8.

The intra-frequency measurements mean measurements at each downlink frequency of cells that are configured in the active set cells. The inter-frequency measurements mean measurements at a frequency different from each downlink frequency of cells that are configured in the active set cells. Therefore, assuming that a cell measured as a serving cell is a cell within the active set cells, the measurements between the serving cell to be measured within the active set cells and a cell having a different frequency within the active set cells is the inter-frequency measurements. This enables the base station apparatus and the mobile station apparatus to automatically manage the inter-frequency measurements and the intra-frequency measurements depending on the configuration of the active set cells.

<Measurement Objects>

The measurement objects are defined for each frequency and do not need to be configured for each cell in the active set cells. In this case, a common value can be used as the measurement identifier (measObjectId) for each cell (component carrier) without discrimination. This configuration is applicable to both the first interpretation of the serving cell and the second interpretation of the serving cell.

However, an identification number of a component carrier (cell identification number within the active set cells) may be specified to configure a measurement object for each cell (component carrier). In this case, the measurement object identifier is differentiated for each cell (component carrier). The mobile station apparatus and the base station apparatus specify a measurement object identifier (measObjectId) including a component carrier identification number as an information element or a component carrier identification number and a measurement object identifier (measObjectId) to identify a measurement object. This configuration is applicable to both the first interpretation of the serving cell and the second interpretation of the serving cell. If an identification number of a component carrier is specified, the serving cell for the measurement object (measurement reference cell (object cell of a measurement result Ms)) is the specified cell (component carrier).

<Reporting Configuration>

If the measurement reference cell (object cell of the measurement result Ms) is already prescribed, the reporting configuration does not need to be configured for each cell of the active set cells. In this case, a common value can be used as the reporting configuration identifier (reportConfigId) without differentiation between component carriers. This configuration is applicable to both the first interpretation of the serving cell and the second interpretation of the serving cell.

The reporting configuration may be implemented such that the reporting configuration is configured for each component carrier considered as the measurement reference cell (object cell of the measurement result Ms) by specifying an identification number of a component carrier (cell identification number within the active set cells) since a plurality of the serving cells exist as the measurement objects.

The mobile station apparatus and the base station apparatus specify a reporting configuration identifier (reportConfigId) including a component carrier identification number as an information element or a component carrier identification number and a reporting configuration identifier (reportConfigId) to identify a reporting configuration. The mobile station apparatus and the base station apparatus define the specified cell (component carrier) as the measurement reference cell (object cell of the measurement result Ms) when considering the reporting configuration. This configuration is applicable to both the first interpretation of the serving cell and the second interpretation of the serving cell.

<Measurement Identifier>

A common value can be used as the measurement identifier (measId) for each component carrier without discrimination. This configuration is applicable to both the first interpretation of the serving cell and the second interpretation of the serving cell.

The measurement identifier (measId) may be implemented such that the measurement identifier (measId) is configured for each component carrier considered as the measurement reference cell (object cell of the measurement result Ms) by specifying an identification number of a component carrier (cell identification number within the active set cells) since a plurality of the serving cells exist as the measurement objects.

The mobile station apparatus and the base station apparatus specify a measurement identifier (measId) including a component carrier identification number as an information element or a component carrier identification number and a measurement identifier (measId) to link the measurement object and the reporting configuration. The mobile station apparatus and the base station apparatus define the specified component carrier as the measurement reference cell (object cell of the measurement result Ms) when considering the measurement. This configuration is applicable to both the first interpretation of the serving cell and the second interpretation of the serving cell.

<First interpretation of Measurement Reference Cell (Object Cell of Measurement Result Ms)>

Figure 9:
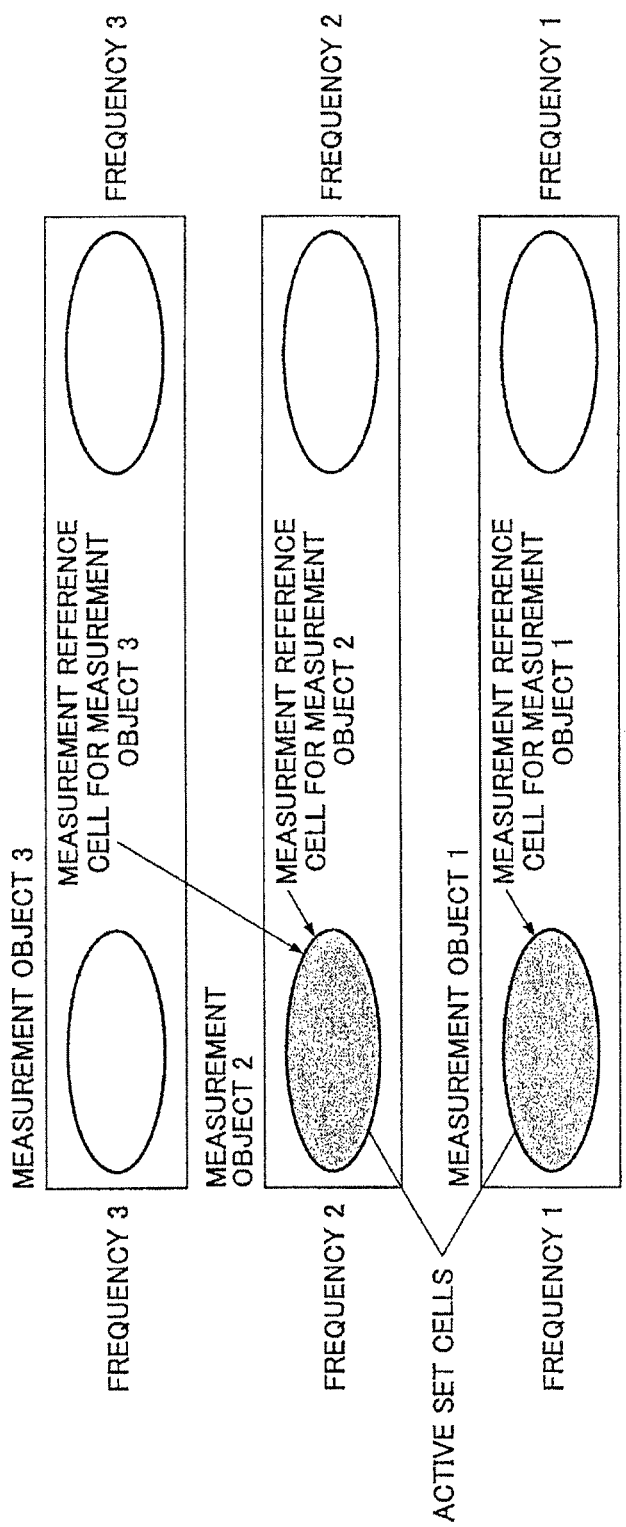
FIG. 9 is a diagram of an example of a measurement reference cell according to the first embodiment of the present invention.

As depicted in FIG. 9, the measurement reference cell (object cell of the measurement result Ms) is a cell (component carrier) that is a reference of a measurement object when the measurement is performed. Namely, a measurement reference cell is a serving cell in a measurement object. As described above, the measurement reference cell (object cell of the measurement result Ms) is identified by the identification number (sell identification number within the active set cells) of the component carrier specified by the measurement identifier (measld), the measurement object, and the reporting configuration in one method.

In other words, the measurement reference cell (object cell of the measurement result Ms) may be specified by any one of the configuration of the measurement identifier (measId), the configuration of the measurement objects, and the reporting configuration. The physical cell identifier (physicalCellIdentity) and the target frequency may be diverted to the identification number of the component carrier. This method (the first interpretation of the measurement reference cell) prescribes or links the measurement reference cell (object cell of the measurement result Ms) for each measurement identifier (measId). When the measurement reference cell (object cell of the measurement result Ms) is prescribed for each measurement identifier (measId), the base station apparatus can configure the measurement for each component carrier.

<Second interpretation of Measurement Reference Cell (Object Cell of Measurement Result Ms)>

Figure 10:
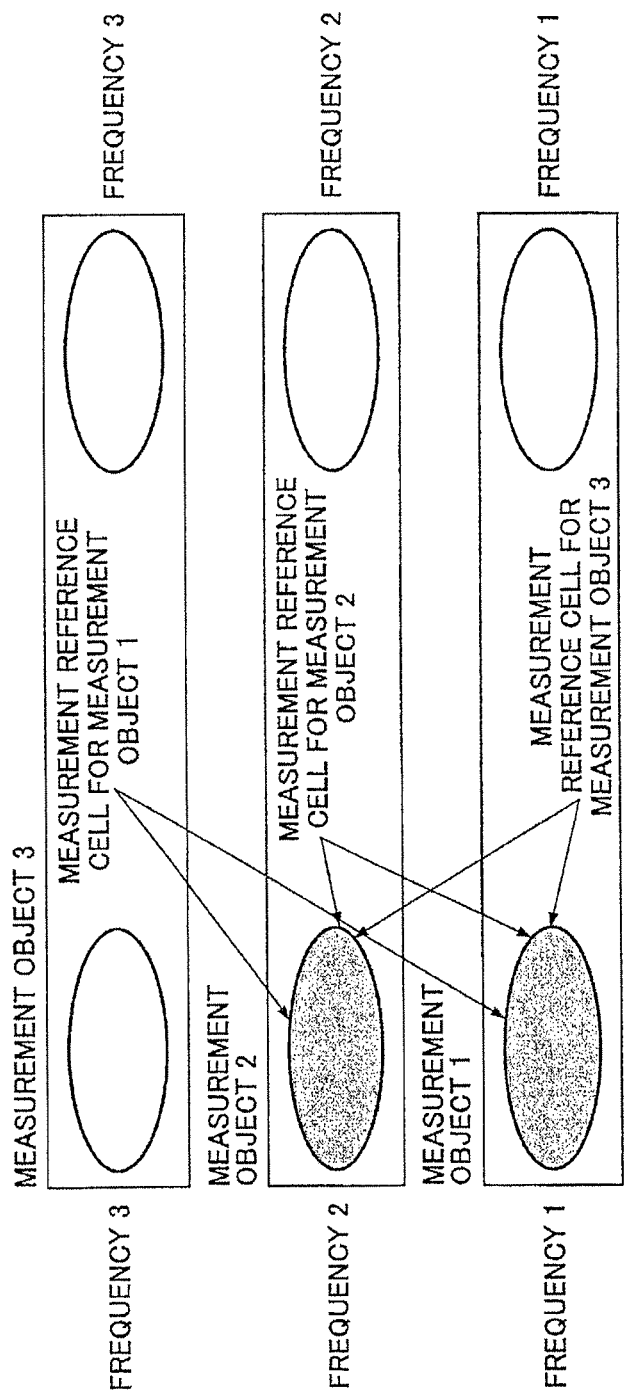
FIG. 10 is a diagram of another example of the measurement reference cell according to the first embodiment of the present invention.

As depicted in FIG. 10, the measurement reference cell (object cell of the measurement result Ms) is a cell (component carrier) that is a reference of a measurement object when the measurement is performed. Namely, a measurement reference cell is a serving cell in a measurement object. In another method (the second interpretation of the measurement reference cell), all or a plurality of the serving cells described in the second interpretation of the serving cell are defined as the measurement reference cells (object cells of the measurement result Ms) (all or a plurality of the cells are defined as the measurement reference cells (object cells of the measurement result Ms)). In other words, this ways that a plurality of the measurement reference cells (object cells of the measurement result Ms) are provided. In this case, the mobile station apparatus reports the report results for a plurality of measurement reference cells (object cells of the measurement result Ms). If a plurality of measurement reference cells are configured independently of the active set cells, a plurality of the measurement reference cells (object cells of the measurement result Ms) are specified by any one of the configuration of the measurement identifier (measId), the configuration of the measurement objects, and the reporting configurations. If a plurality of measurement reference cells are defined as all the cells of the active set cells, the measurement reference cells (object cells of the measurement result Ms) are determined depending on the configuration of the active set cells.

<Serving Cell Quality Threshold (s-Measure)>

If the base station apparatus provides the serving cell quality threshold (s-Measure), the mobile station apparatus performs the measurement of neighboring cells and the event evaluation (whether the event triggering criteria are satisfied; also referred to as the evaluation of reporting criteria) when the quality (RSRP value) of the measurement reference cell (object cell of the measurement result Ms) is lower than the serving cell quality threshold (s-Measure). On the other hand, if the base station apparatus does not provide the serving cell quality threshold (s-Measure), the mobile station apparatus performs the measurement of neighboring cells and the event evaluation regardless of the quality (RSRP value) of the measurement reference cell (object cell of the measurement result Ms).

<First interpretation of Event Triggering Criteria>

Figure 11:
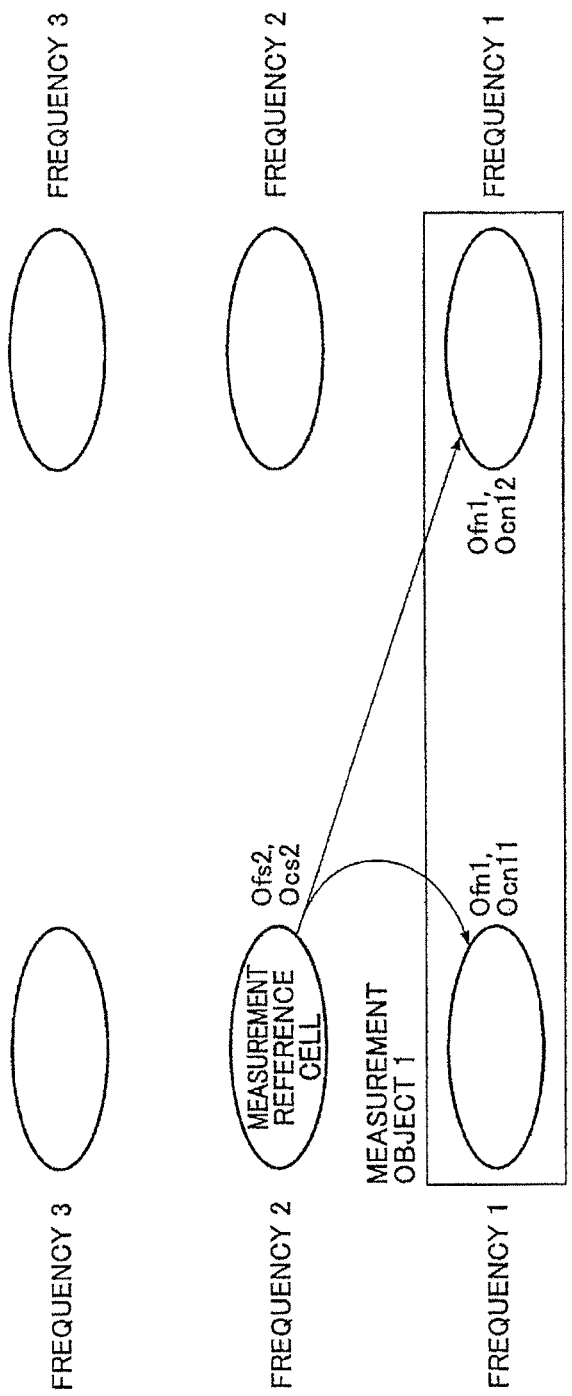
FIG. 11 is a diagram of an example of first interpretation of event triggering criteria according to the first embodiment of the present invention.

Event triggering criteria for performing a measurement report (first interpretation of the event triggering criteria) will be described with reference to FIG. 11.

The symbol Ms denotes a measurement result for a cell (component carrier) specified as the measurement reference cell. The symbol Mn denotes a measurement result for a cell (component carrier) not specified as the measurement reference cell in the measurement object.

The symbol Ofn denotes a frequency-specific measurement offset value for a frequency of a cell (component carrier) not specified as the measurement reference cell. In the case of the intra-frequency measurements, Ofn is the same as Ofs. In the case of the inter-frequency measurements, Ofn is a frequency offset (offsetFreq) included in the measurement object EUTRA (measObjectEUTRA) corresponding to a downlink frequency different from the measurement reference cell.

The symbol Ocn is a cell-specific measurement offset value for a frequency of a cell (component carrier) not specified as the measurement reference cell. In the case of the intra-frequency measurements, Ocn is a cell individual offset (cellIndividualOffset) included in the measurement object EUTRA (measObjectEUTRA) of the downlink frequency same as the measurement reference cell. In the case of the inter-frequency measurements, Ocn is a cell individual offset (cellIndividualOffset) included in the measurement object EUTRA (measObjectEUTRA) corresponding to a downlink frequency different from the measurement reference cell.

The symbol Ofs is a frequency-specific offset value for a frequency of the measurement reference cell.

The symbol Ocs is a cell-specific measurement offset value for the measurement reference cell.

The mobile station generates the events in accordance with the measurement result Ms of the measurement reference cell (events A1, A2), or the measurement result Ms of the measurement reference cell and the measurement result Mn of a cell (component carrier) not specified as the measurement reference cell (events A3, A5), or the measurement result Mn of a cell (component carrier) not specified as the measurement reference cell (event A4). It is desirable that this implementation 1 of the event triggering criteria is applied to the first interpretation of the serving cell and the first interpretation of the measurement reference cell. By setting the measurement parameters for each measurement reference cell in this way, the base station apparatus can manipulate the priority of reporting among the component carriers.

<Second interpretation of Event Triggering Criteria>

Figure 12:
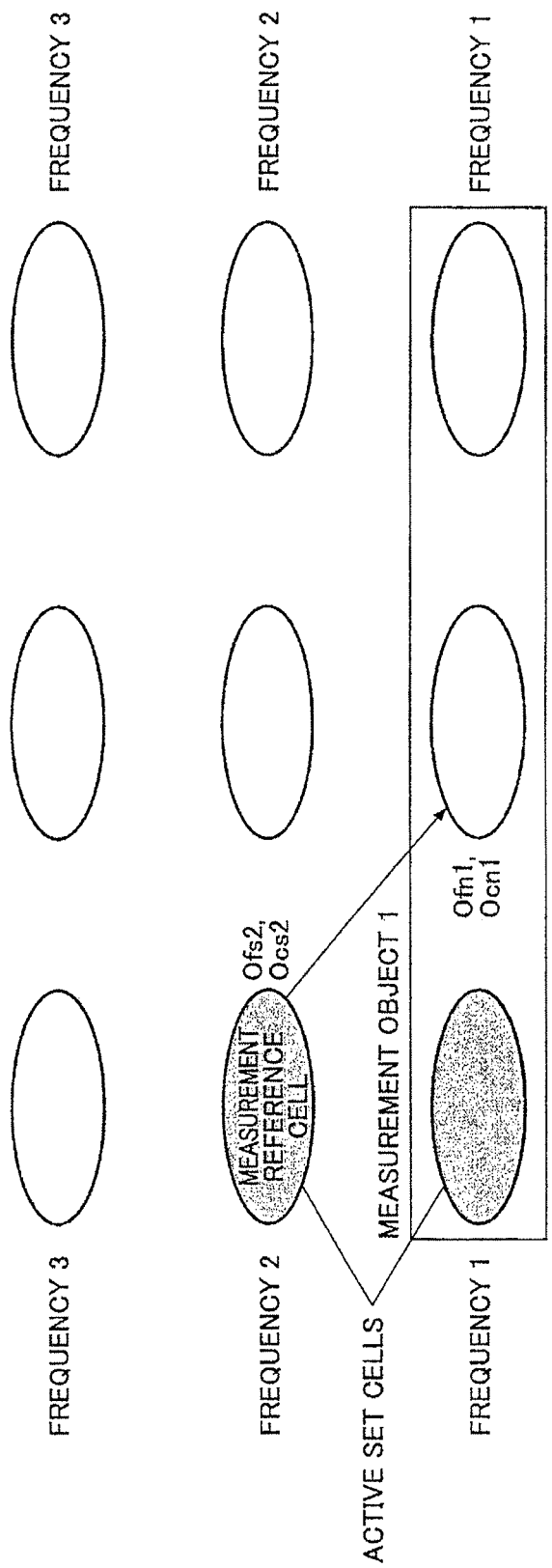
FIG. 12 is a diagram of an example of second interpretation of event triggering criteria according to the first embodiment of the present invention.

Other event triggering criteria for performing a measurement report (second interpretation of the event triggering criteria) will be described with reference to FIG. 12.

The symbol Ms denotes a measurement result for a cell (component carrier) specified as the measurement reference cell. The symbol Mn denotes a measurement result for a cell (component carrier) not included in the active set cells in the measurement object.

Other parameters are the same as in the first interpretation of the event triggering criteria.

The mobile station generates the events in accordance with the measurement result Ms of the measurement reference cell (events A1, A2), or the measurement result Ms of the measurement reference cell and the measurement result Mn of a cell (component carrier) not included in the active set cells (events A3, A5), or the measurement result Mn of a cell (component carrier) not included in the active set cells (event A4). In this case, an event between cells in the active set cells is not triggered. It is desirable that the second interpretation of the event triggering criteria is applied to the second interpretation of the serving cell and the first interpretation of the measurement reference cell. By setting the measurement parameters for each measurement reference cell in this way, the base station apparatus can manipulate the priority of reporting among the component carriers.

<Third interpretation of Event Triggering Criteria>

Figure 13:
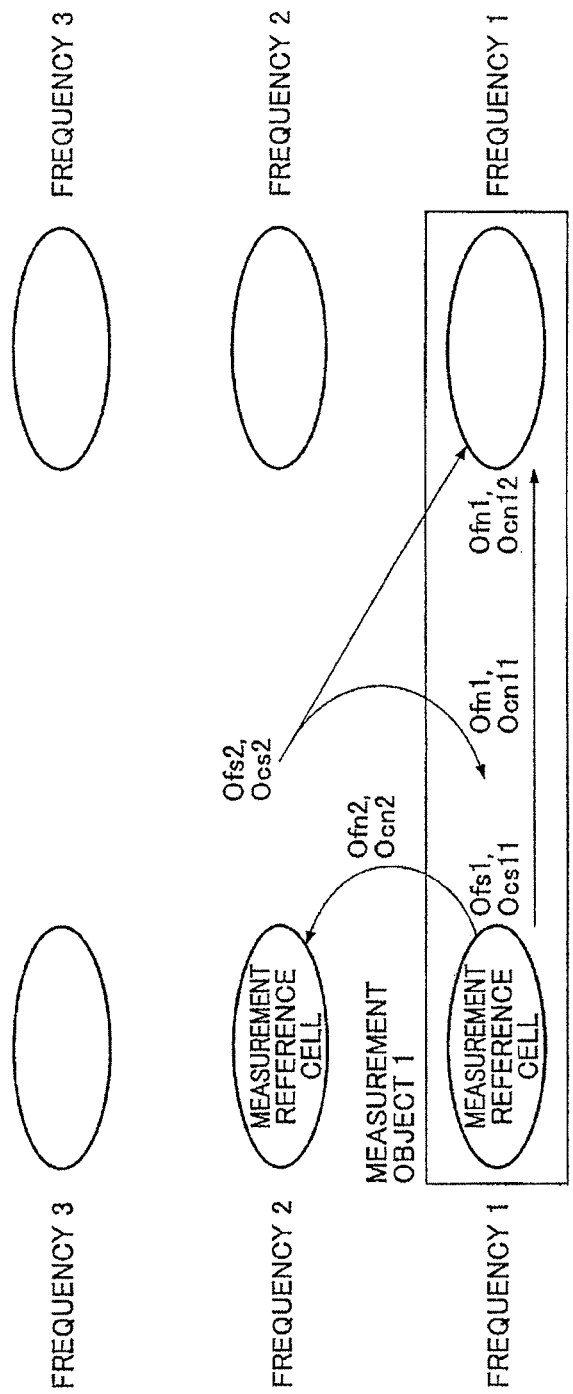
FIG. 13 is a diagram of an example of third interpretation of event triggering criteria according to the first embodiment of the present invention.

Other event triggering criteria for performing a measurement report (third interpretation of the event triggering criteria) will be described with reference to FIG. 13.

The symbol Ms denotes a measurement result for each of a plurality of the measurement reference cells (component carriers) as described in the second interpretation of the measurement reference cell. The symbol Mn denotes a measurement result for a cell (component carrier) other than the measurement reference cell at the time of measurement of each of the measurement reference cells (object cells of the measurement result Ms) in the measurement object.

The symbol Ofn denotes a frequency-specific measurement offset value for a frequency of the object cell of Mn. In the case of the intra-frequency measurements, Ofn is the same as Ofs. In the case of the inter-frequency measurements, Ofn is an offset frequency (offsetFreq) included in the measurement object EUTRA (measObjectEUTRA) corresponding to a downlink frequency different from each of the measurement reference cells.

The symbol Ocn is a cell-specific measurement offset value for a frequency of the object cell of Mn. In the case of the intra-frequency measurements, Ocn is a cell individual offset (cellIndividualOffset) included in the measurement object EUTRA (measObjectEUTRA) of the downlink frequency same as each of the measurement reference cells. In the case of the inter-frequency measurements, Ocn is a cell individual offset (cellIndividualOffset) included in the measurement object EUTRA (measObjectEUTRA) corresponding to a downlink frequency different from each of the measurement reference cells.

The symbol Ofs is a frequency-specific offset value for a frequency of each of the measurement reference cells.

The symbol Ocs is a cell-specific measurement offset value for each of the measurement reference cells.

The mobile station generates the events in accordance with the measurement result Ms of each of the measurement reference cells (events A1, A2), or the measurement result Ms of each of the measurement reference cells and the measurement result Mn of a cell (component carrier) other than the measurement reference cell at the time of measurement of each of the measurement reference cells (object cells of the measurement result Ms) (events A3, A5), or the measurement result Mn of a cell (component carrier) other than the measurement reference cell at the time of measurement of each of the measurement reference cells (object cells of the measurement result Ms) (event A4). It is desirable that this implementation 3 of the event triggering criteria is applied to the first interpretation of the serving cell and the second interpretation of the measurement reference cell. By setting the measurement parameters for each measurement reference cell in this way, the base station apparatus can manipulate the priority of reporting among the component carriers.

<Fourth interpretation of Event Triggering Criteria>

Figure 14:
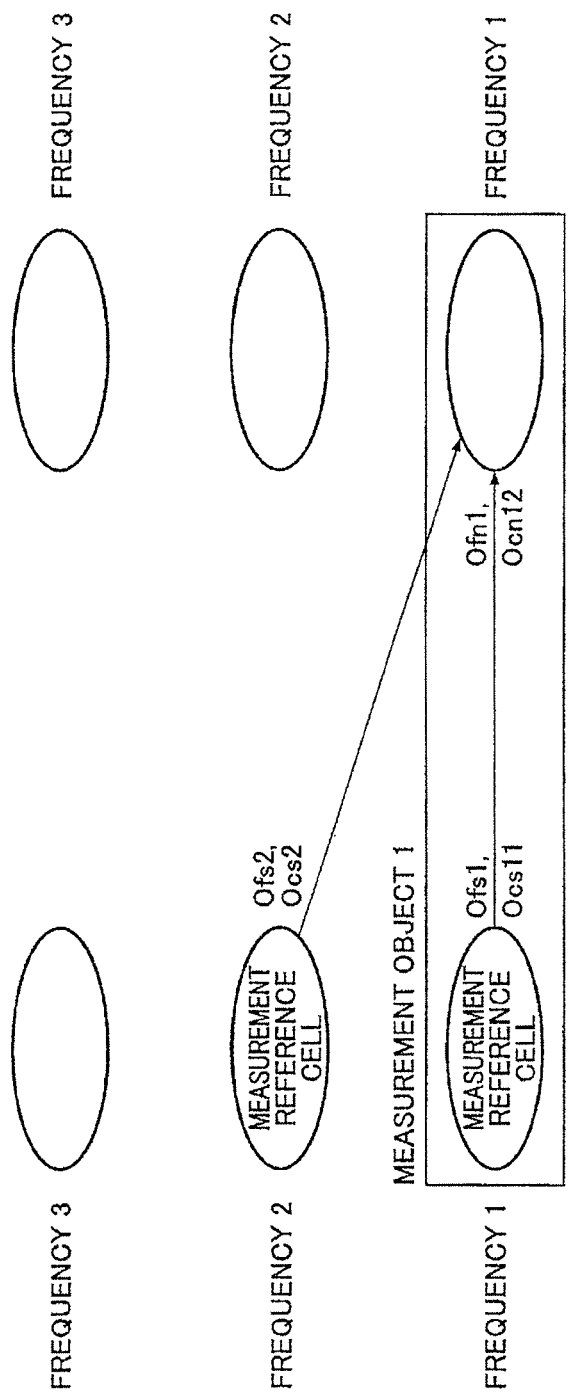
FIG. 14 is a diagram of an example of fourth interpretation of event triggering criteria according to the first embodiment of the present invention.

Other event triggering criteria for performing a measurement report (fourth interpretation of the event triggering criteria) will be described with reference to FIG. 14.

The symbol Ms denotes a measurement result for each of all or a plurality of the measurement reference cells (component carriers) in the active set as described in the second interpretation of the measurement reference cell. The symbol Mn denotes a measurement result for a cell (component carrier) other than the cell configured as the measurement reference cell (object cell of the measurement result Ms) in the measurement object.

Other parameters are the same as in the third interpretation of the event triggering criteria.

The mobile station generates the events in accordance with the measurement result Ms of the measurement reference cell (events A1, A2), or the measurement result Ms of the measurement reference cell and the measurement result Mn of a cell (component carrier) not specified as the measurement reference cell (events A3, A5), or the measurement result Mn of a cell (component carrier) not specified as the measurement reference cell (event A4). In this case, an event between cells configured as the measurement reference cells (object cells of the measurement result Ms) is not triggered. It is desirable that this implementation 3 of the event triggering criteria is applied to the second interpretation of the serving cell and the second interpretation of the measurement reference cell. By setting the measurement parameters for each measurement reference cell in this way, the base station apparatus can manipulate the priority of reporting among the component carriers.

<Regarding Measurement Result>

If the measurement reference cell is specified for each measurement identifier (measId), the measurement result is the same as that when the active set cells are not configured (when the carrier aggregation is not performed) and it is desirable that the serving cell measurement result (measResultServing) is reported as the results of the reference signal received power (RSRP) and the reference signal received quality (RSRQ) of the cell configured as the measurement reference cell. In this case, the base station plays a leading role in specifying/determining the measurement reference cell. If the measurement reference cell is identifiable by a measurement identifier (measId) and an identification number of a component carrier (cell identification number in the active set cells), the identification number of the component carrier (cell identification number in the active set cells) is also specified. That is, the mobile station apparatus performs the measurement for a plurality of measurement reference cells and reports the measurement reference cell satisfying the triggering criteria. In this case, the mobile station apparatus takes the lead in specifying/determining the measurement reference cell. Although the physical cell identifier (physicalCellIdentity) utilized for identifying a cell may be the same between component carriers, the physical cell identifier is identifiable by a frequency since the measurement object EUTRA (measObjectEUTRA) is configured for each frequency.

If a plurality of measurement reference cells are specified to the measurement identifier, the measurement result is reported in the following method (first method of the measurement result).

The measurement result is reported as the results of the reference signal received power (RSRP) and the reference signal received quality (RSRQ) of all the cells configured as the measurement reference cells (or all the cells in the active set cells). That is, the measurement report includes the results of the reference signal received power (RSRP) and the reference signal received quality (RSRQ) of all the cells configured as the measurement reference cells (or all the cells in the active set cells) regardless of type of event. This enables the base station apparatus to comprehend the statuses of all cells configured as the measurement reference cells by the mobile station apparatus (or all the cells in the active set cells) without particular specification and to estimate a cause of each event.

In another method, (second method of the measurement result), if a plurality of measurement reference cells are specified to the measurement identifier, the measurement result is reported as follows.

The mobile station apparatus determines an optimum cell from the results of the reference signal received power (RSRP) and/or the reference signal received quality (RSRQ) of all the cells configured as the measurement reference cells (or all the cells in the active set cells). The report is made by including the component carrier identification number (cell identification number in the active set cells) of the optimum cell and the reference signal received power (RSRP) and/or the reference signal received quality (RSRQ) of the optimum cell in the serving cell measurement result. The event to be reported is only the event with the optimum cell defined as the measurement reference cell. For the measurement of the optimum cell, values may be compared after adding Ofs of the frequencies and Ocs of the measurement reference cells to the measurement reference cells. This enables the base station apparatus to manipulate the priority of reporting among the component carriers.

The measurement repot for the optimum cell among all the cells configured as the measurement reference cells (or all the cells in the active set cells) may be considered as another event and assigned with an event identifier (eventId). In other words, a report is triggered when the optimum cell (component carrier) is changed in consideration of Ofs of the frequencies and Ocs of the measurement reference cells for the measurement reference cells.

<Addition/Modification/Deletion of Active Set Cell>

A processing method of the system information related to the measurement when an active set cell (component carrier) is added/modified with the described.

When a notification of addition/modification of an active set cell (component carrier) is given, the measurement reference cells (object cells of the measurement result Ms) are determined in accordance with the configuration of the active set cells if a plurality of the measurement reference cells are defined as all the cells of the active set cells in the second interpretation of the measurement reference cells.

Figure 15:
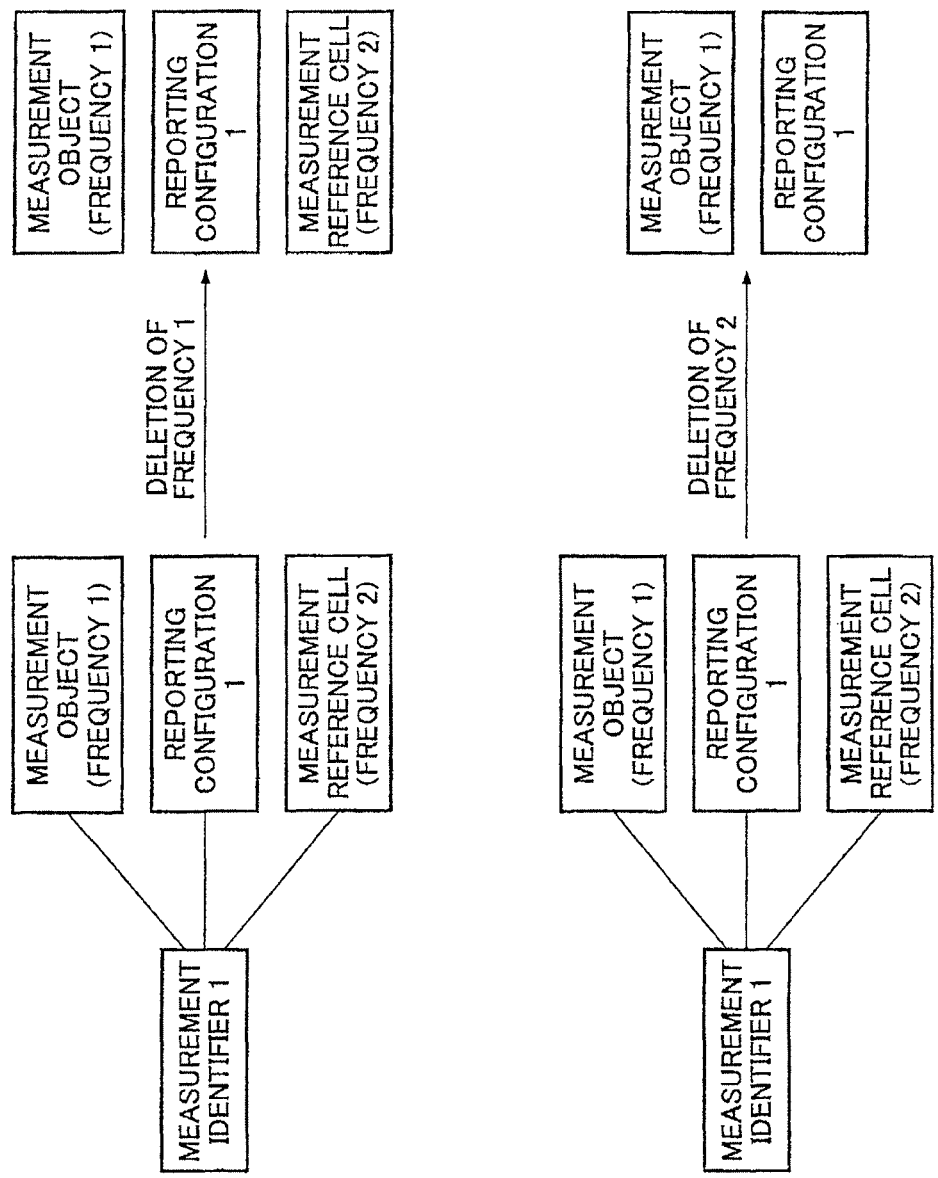
FIG. 15 is a diagram of an example of a processing method of system information related to the measurement according to the first embodiment of the present invention.

A processing method of the system information related to the measurement when an active set cell (component carrier) is deleted will be described with reference to FIG. 15.

If an active set cell is deleted, all the measurement identifiers (measId) linked to the measurement object identifier (measObjectId) corresponding to the carrier frequency of the deleted cell are deleted.

If the active set cell is deleted, all the measurement identifiers (measId) linked to the measurement reference cell corresponding to the carrier frequency of the deleted cell are deleted.

A processing method of the system information related to the measurement when active set cells (component carriers) are added and deleted will be described.

If active set cells are concurrently added and deleted (replacement of active set cells), the measurement identifier (measId) linked to the measurement object identifier (measObjectId) corresponding to the carrier frequency of the added cell is linked to the measurement identifier (measId) linked to the measurement object identifier (measObjectId) corresponding to the carrier frequency of the deleted cell, and the measurement identifier (measId) linked to the measurement object identifier (measObjectId) corresponding to the carrier frequency of the deleted cell is linked to the measurement identifier (measId) linked to the measurement object identifier (measObjectId) corresponding to the carrier frequency of the added cell.

By automatically changing the measurement configuration in accordance with the processing such as addition/deletion/modification/replacement of an active set cell, signals for the configuration can be reduced and the configuration can quickly be applied.

A wireless communication system according to a second embodiment of the present invention will be described. Only the sections of the second embodiment different from the first embodiment will hereinafter be described.

A DL master frequency (also referred to as downlink primary component carrier or downlink primary cell) may be a downlink frequency layer (a component carrier or a component carrier group) that the mobile station apparatus initially accesses or monitors, or a certain downlink frequency layer determined in accordance with specification from the base station apparatus. At least a downlink synchronization signal (SCH) is located for acquiring the downlink synchronization.

A DL slave frequency (also referred to as downlink secondary component carrier or downlink secondary cell) is a downlink frequency layer not specified as the DL master frequency among accessible component carriers specified by the base station apparatus.

A UL master frequency (also referred to as uplink primary component carrier) may be an uplink frequency layer (a component carrier or a component carrier group) that the mobile station apparatus initially access, or component carrier or a component carrier group specified by the DL master frequency or corresponding to the DL master frequency, or a certain uplink frequency layer determined in accordance with specification from the base station apparatus.

A UL slave frequency (also referred to as uplink secondary component carrier) is an uplink frequency layer not specified as the UL master frequency among accessible component carriers specified by the base station apparatus.

Hereinafter, a master frequency or a slave frequency in the following description means the DL master frequency and/or the UL master frequency, or the DL slave frequency and/or the UL slave frequency.

Master frequencies and slave frequencies of mobile station apparatuses may be different. In other words, a master frequency for one mobile station apparatus may be configured as a slave frequency for another mobile station apparatus. This represents that a component carrier specific to a mobile station apparatus can be configured since a component carrier is added to a mobile station apparatus through a dedicated signal.

A master frequency and a slave frequency may be arranged in adjacent carrier frequencies or distant carrier frequencies.

A master frequency may be defined for each function. A master frequency related to the measurement will be described in this description.

The mobile station apparatus manages system information field that is a content of the system information and a system information element (IE) comprises of one or more system information fields. These parts of the system information (including the system information fields and the system information elements) are managed by RRC of the mobile station apparatus and the base station apparatus for each component carrier. The system information acts as configuration information parameters managed by the system that performs communications using the mobile station apparatus and the base station apparatus and also acts as parameters necessary for the mobile station apparatus to operate in the system. The system information includes a measurement configuration, a measurement identifier (measId), a measurement object, a reporting configuration and others.

The system information managed by RRC is broadcasted through the broadcast control channel (BCCH) or provided from the base station apparatus to the mobile station apparatus through the RRC signaling of the common control channel (CCCH) and/or the dedicated control channel (DCCH).

When the master frequency is specified, the mobile station apparatus and the base station apparatus apply and manage the system information used at the master frequency to the component carriers.

A method of measurement of the mobile station apparatus will then be described in the case of communication using a plurality of component carriers.

<Interpretation of Serving Cell>

Figure 16:
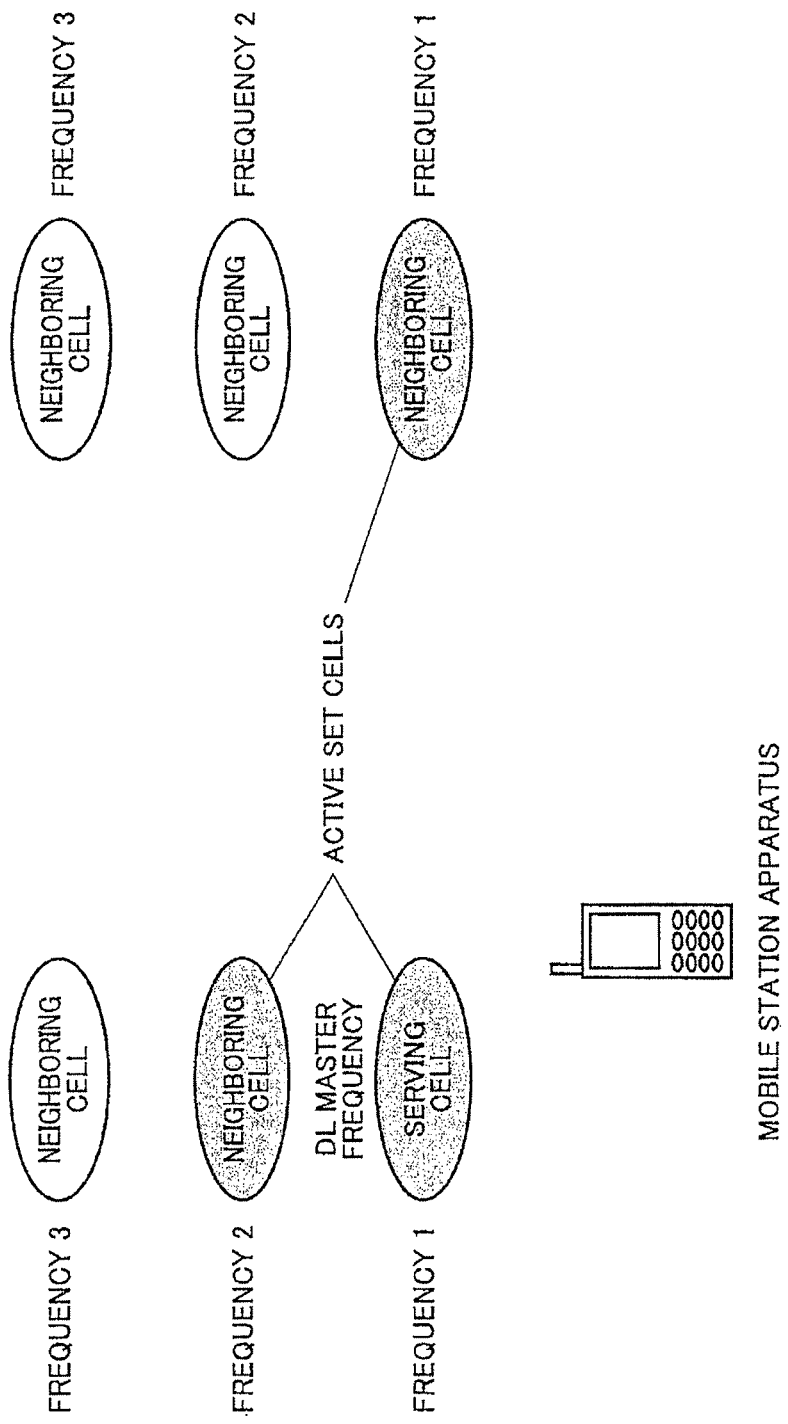
FIG. 16 is a diagram of an example of a serving cell according to a second embodiment of the present invention.

One example of concept of the serving cell will be described with reference to FIG. 16. The mobile station apparatus and the base station apparatus consider the DL master frequency as the serving cell. Neighboring cells are cells other than the DL master frequency. When one cell in the active set cells is considered as the serving cell, neighboring cells are cells other than the serving cell. Therefore, a cell in an active set can be considered as a neighboring cell depending on which cell is considered as the serving cell. This leads to an extension of the concept of the serving cell and, therefore, the configuration related to a measurement of a plurality of frequency layers can efficiently be performed. The measurement can be performed with reference to one cell.

Figure 17:
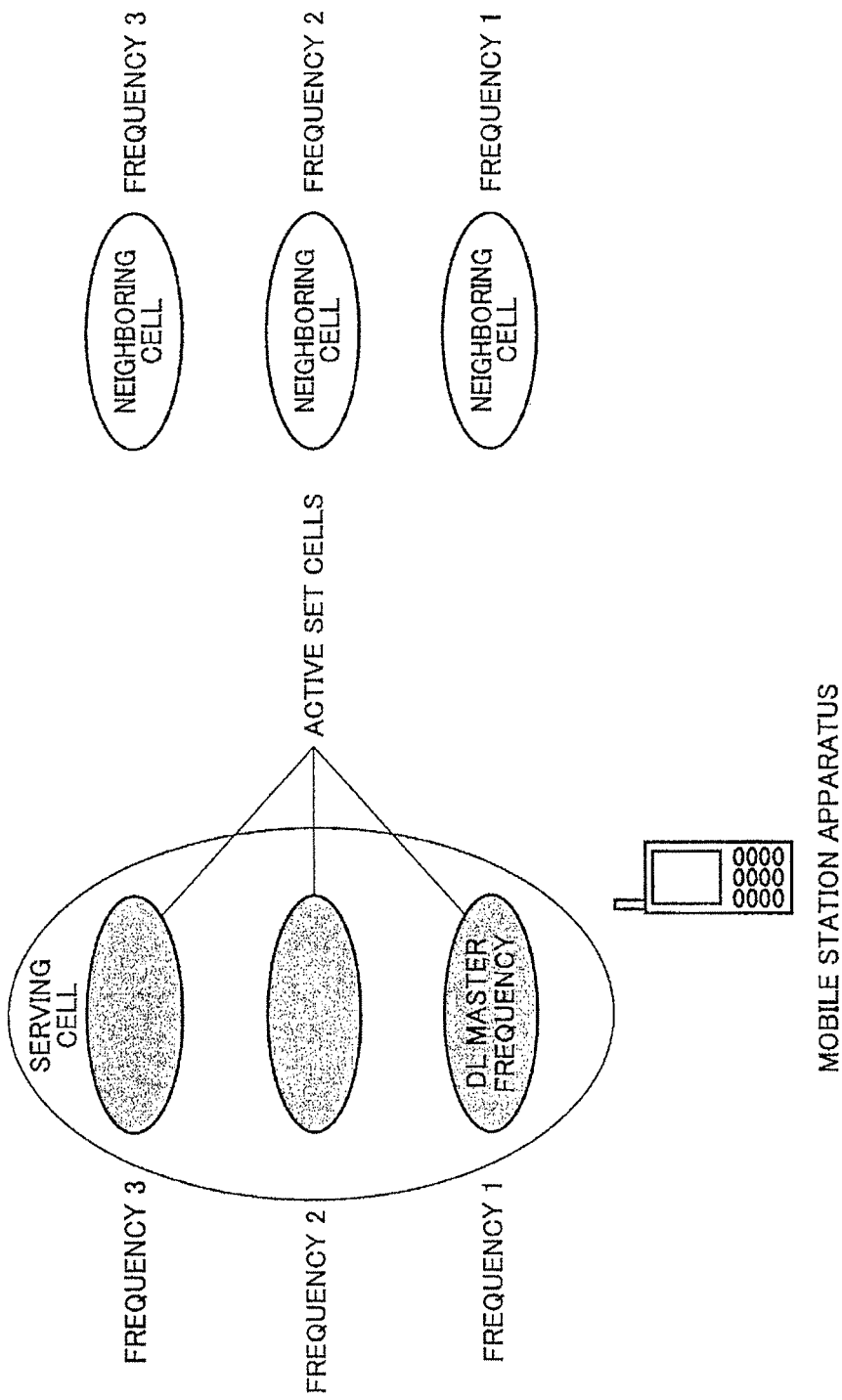
FIG. 17 is another diagram of an example of a serving cell according to the second embodiment of the present invention.

Another example of concept of the serving cell will be described with reference to FIG. 17. The mobile station apparatus and the base station apparatus consider the DL master frequency in the serving cells as the measurement reference cell. The serving cells comprise of a plurality of component carriers including the DL master frequency. The neighboring cells are cells other than the serving cells comprise of a plurality of component carriers including the DL master frequency. This leads to an extension of the concept of serving cell and, therefore, the configuration related to a measurement of a plurality of frequency layers can efficiently be performed. The measurement can be performed with reference to one component carrier in cells.

<Interpretation of Inter-Frequency Measurement>

Figure 18:
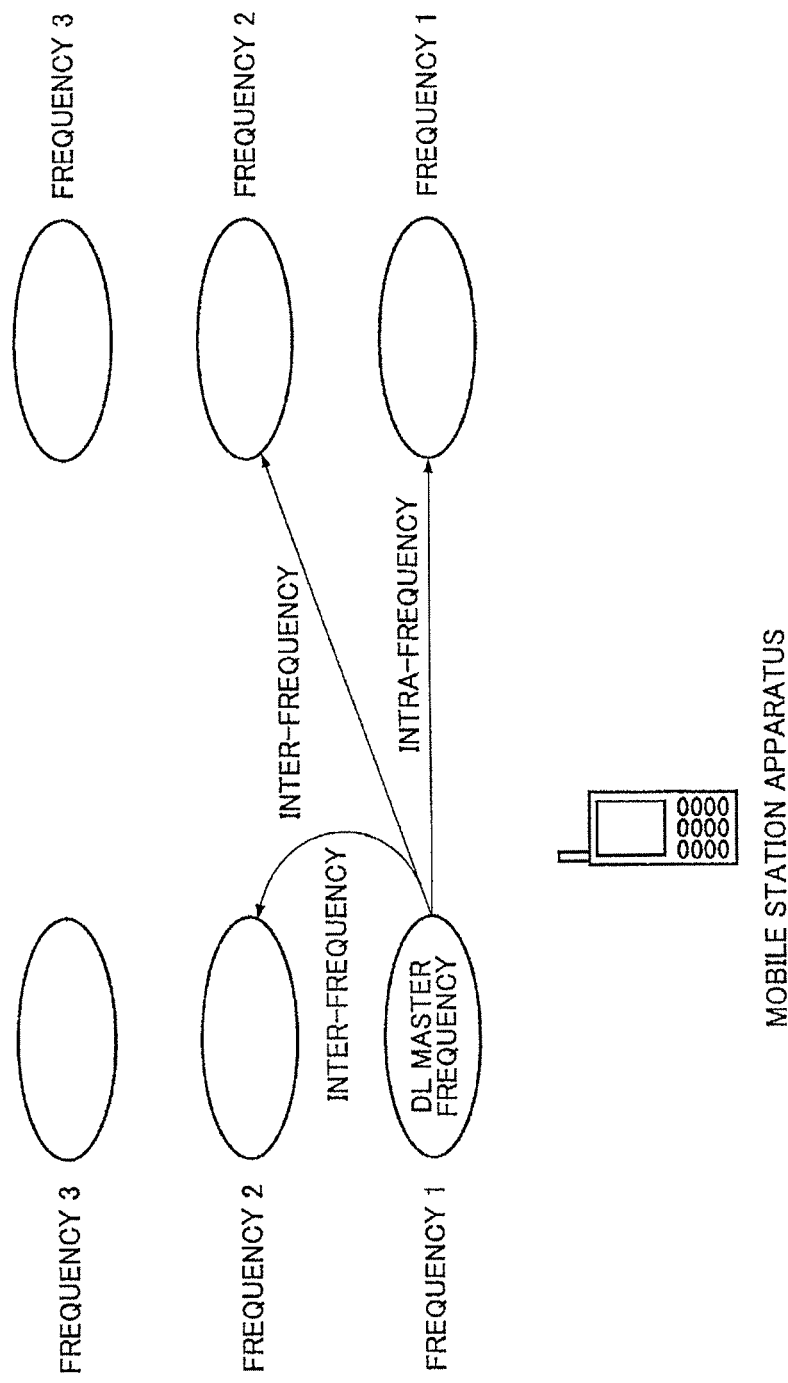
FIG. 18 is a diagram of an example of inter-frequency measurement and intra-frequency measurement according to the second embodiment of the present invention.

The definition of the intra-frequency measurement and the inter-frequency measurement when the active set cells are configured will be described with reference to FIG. 18. The intra-frequency measurement is a measurement at the downlink frequency of the DL master frequency. The inter-frequency measurement is a measurement at a frequency different from the downlink frequency of the DL master frequency.

<Measurement Object>

A common value can be used as the measurement identifier (measObjectId) for each component carrier without discrimination.

<Reporting Configuration>

A common value can be used as the reporting configuration identifier (reportConfigId) for each component carrier without discrimination.

<Measurement Identifier>

A common value can be used as the measurement identifier (measId) for each component carrier without discrimination.

<Interpretation of Event Triggering Criteria>

Figure 19:
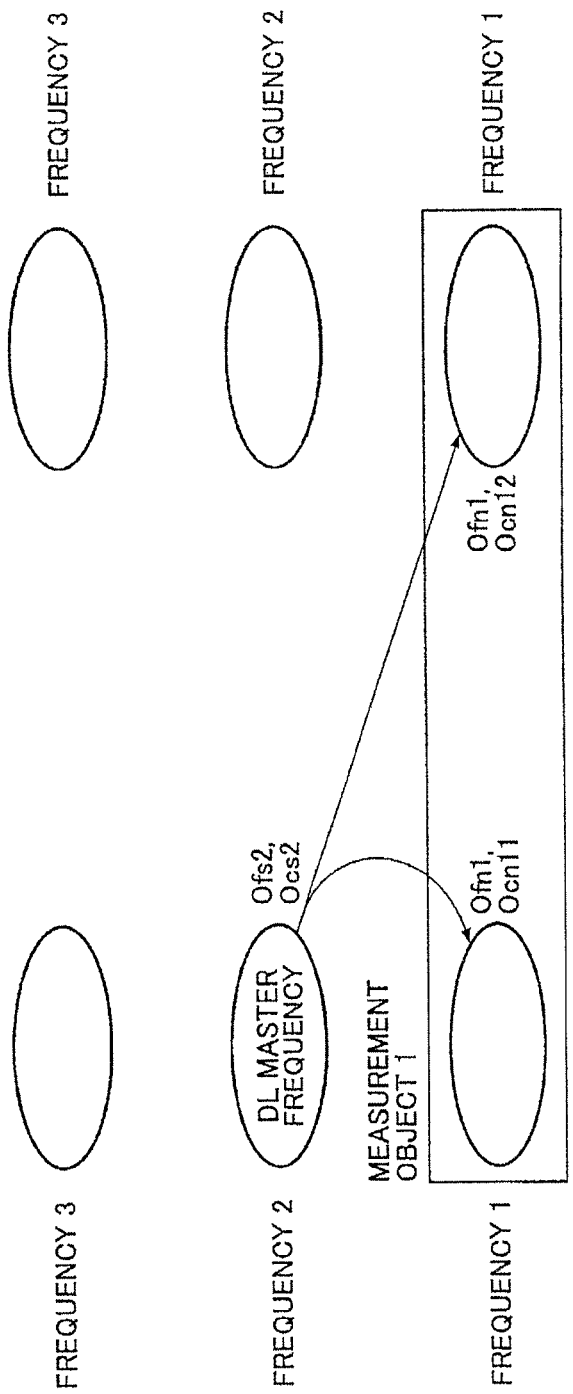
FIG. 19 is a diagram of an example of interpretation of event triggering criteria according to the second embodiment of the present invention.

Event triggering criteria for performing a measurement report will be described with reference to FIG. 19.

The symbol Ms denotes a measurement result for the DL master frequency. The symbol Mn denotes a measurement result for a cell (component carrier) not specified as the DL master frequency.

The symbol Ofn denotes a frequency-specific measurement offset value for a frequency of a cell (component carrier) not specified as the DL master frequency. In the case of the intra-frequency measurements, Ofn is the same as Ofs. In the case of the inter-frequency measurements, Ofn is an offset frequency (offsetFreq) included in the measurement object EUTRA (measObjectEUTRA) corresponding to a downlink frequency different from the DL master frequency.

The symbol Ocn is a cell-specific measurement offset value for a frequency of a cell (component carrier) not specified as the DL master frequency. In the case of the intra-frequency measurements, Ocn is a cell individual offset (cellIndividualOffset) included in the measurement object EUTRA (measObjectEUTRA) of the downlink frequency same as the DL master frequency. In the case of the inter-frequency measurements, Ocn is a cell individual offset (cellIndividualOffset) included in the measurement object EUTRA (measObjectEUTRA) corresponding to a downlink frequency different from the DL master frequency.

The symbol Ofs is a frequency-specific offset value for a frequency of the DL master frequency.

The symbol Ocs is a cell-specific measurement offset value for the DL master frequency.

The mobile station apparatus generates events in accordance with the measurement result Ms of the DL master frequency and the measurement result Mn of a cell (component carrier) not specified as the DL master frequency. The control can be facilitated by unifying the measurement parameter configuration with the DL master frequency in this way.

<Regarding Measurement Result>

The serving cell measurement result (measResultServing) is reported as the results of the reference signal received power (RSRP) and the reference signal received quality (RSRQ) of the cell configured as the DL master frequency.

<Change of DL master frequency>

In case the DL master frequency is changed, the measurement identifier (measId) linked to the measurement object identifier (measObjectId) corresponding to the carrier frequency of the DL master frequency after the change is linked to the measurement identifier (measId) linked to the measurement object identifier (measObjectId) corresponding to the carrier frequency of the DL master frequency before the change, and the measurement identifier (measId) linked to the measurement object identifier (measObjectId) corresponding to the carrier frequency of the DL master frequency before the change is linked to the measurement identifier (measId) linked to the measurement object identifier (measObjectId) corresponding to the carrier frequency of the DL master frequency after the change. By automatically changing the measurement configuration in accordance with processing such as a change in the DL master frequency, signals for the configuration can be reduced and the configuration can quickly be applied.

In each of the embodiments, a component carrier can simply be construed as a cell and a mobile station apparatus can be construed as managing system information of a plurality of cells. In this case, it is construed that an active (activated) cell is added or a cell is activated in the RRC signaling instead of addition of a component carrier. Communication through a plurality of component carriers is construed as communication through a plurality of active cells. It can also be construed that a plurality of component carriers is managed in one cell.

Although one system comprises of a plurality of component carriers in the description of each of the embodiments, it can be construed that a plurality of systems are aggregated and configured as one system. A component carrier can also be construed as indicating an area where a system is operated by matching a carrier frequency with the center of each component carrier on the certain reception side or the certain transmission side.

The embodiments may be implemented in a combined manner.

In each of the embodiments, pluralities of base station apparatuses and mobile station apparatuses may exist. A mobile station is not limited to a moving terminal and may be realized by implementing the function of the mobile station apparatus in a base station apparatus or a fixed terminal.

In each of the embodiments described above, a program for implementing the functions in the base station apparatus or the functions in the mobile station apparatus may be recorded in a computer readable recording medium and the program recorded in this recording medium may be read and executed by a computer system to control the base station apparatus or the mobile station apparatus. A "computer system" as used herein is assumed to include OS and hardware such as peripherals.

A "computer readable recording medium" means a portable medium such as a flexible disk, a magnetic optical disk, ROM, or CD-ROM, and a storage device such as a hard disk built into a computer system. A "computer readable recording medium" is assumed to include those dynamically retaining a program for a short time like a network such as the internet and communication wires when a program is transmitted through a communication line such as a telephone line, and those retaining a program for a certain time like a volatile memory within a computer system acting as a server or a client in such a case. The program may be for the purpose of implementing a section of the functions and may be a program capable of implementing the functions in combination with a program already recorded in a computer system.

Although the embodiments of the present invention have been described in detail with reference to the drawings, specific configurations are not limited to the embodiments and the claims include designs and others, within a range not departing from the spirit of the present invention.

EXPLANATIONS OF REFERENCE NUMERALS

100 . . . base station apparatus; 101 . . . data control section; 102 . . . OFDM modulating section; 103 . . . wireless section; 104 . . . scheduling section; 105 . . . channel estimating section; 106 . . . DFT-S-OFDM demodulating section; 107 . . . data extracting section; 108 . . . higher layer; 200 . . . mobile station apparatus; 201 . . . data control section; 202 . . . DFT-S-OFDM modulating section; 203 . . . wireless section; 204 . . . scheduling section; 205 . . . channel estimating section; 206 . . . OFDM demodulating section; 207 . . . data extracting section; 208 . . . higher layer; A1, A2 . . . antenna section; 1001 . . . base station apparatus; 1002 . . . base station apparatus; 11 . . . transmitting section; 21 . . . transmitting section; 22 . . . transmitting section; 300 . . . control station.

The invention claimed is:

1. A terminal apparatus comprising a wireless circuitry and a radio resource control circuitry, the terminal apparatus communicating with a base station apparatus by carrier aggregation using a plurality of cells including at least a first cell and a second cell, each of the plurality of cells having a different frequency, wherein
the wireless circuitry is configured to and/or programmed to:
receive, from the base station apparatus, a measurement configuration, wherein
the measurement configuration includes measurement objects and reporting configurations,
one of the measurement objects and one of the reporting configurations are linked by a measurement identity,
each of the measurement objects indicates a measurement frequency, and
one or more of the reporting configurations each include a criterion related to event triggered reporting of measurements,
the event triggered reporting is triggered based on evaluation of the criterion relating to an event,
the event is related to a measurement reference cell of the plurality of cells,
the one or more of the reporting configurations each include an event identity for selecting the criterion relating to the event; and
the radio resource control circuitry is configured to and/or programmed to:
determine (i) the first cell as a measurement reference cell among the plurality of the cells based on a first measurement object linked to a first reporting configuration corresponding to a first event and (ii) the second cell as a measurement reference cell among the plurality of the cells based on a second measurement object linked to a second reporting configuration corresponding to a second event, and
perform a measurement of the first cell and a measurement of the second cell,
wherein (i) a measurement result of the first cell is used as a measurement result (Ms) of a serving cell in the first event and (ii) a measurement result of the second cell is used as a measurement result (Ms) of a serving cell in the second event.

2. A base station apparatus comprising a wireless circuitry and a radio resource control circuitry, the base station apparatus communicating with a terminal apparatus by carrier aggregation using a plurality of cells including at least a first cell and a second cell, each of the plurality of cells having a different frequency, wherein
the wireless circuitry is configured to and/or programmed to:
transmit, to the terminal apparatus, a measurement configuration, wherein
the measurement configuration includes measurement objects and reporting configurations,
one of the measurement objects and one of the reporting configurations are linked by a measurement identity,
each of the measurement objects indicates a measurement frequency,
one or more of the reporting configurations each include criterion related to event triggered reporting of measurements,
the event triggered reporting is triggered base on evaluation of the criterion relating to an event,
the event is related to a measurement reference cell of the plurality of cells,
the one or more of the reporting configurations each include an event identity for selecting the criteria relating to the event,
(i) determination of the first cell as a measurement reference cell among the plurality of the cells is based on a first measurement object linked to a first reporting configuration corresponding to a first event and (ii) determination of the second cell as a measurement reference cell among the plurality of the cells is based on a second measurement object linked to a second reporting configuration corresponding to a second event, wherein (i) a measurement result of the first cell is used as a measurement result (Ms) of a serving cell in the first event and (ii) a measurement result of the second cell is used as a measurement result (Ms) of a serving cell in the second event.

3. A method performed by a terminal apparatus, the terminal apparatus communicating with a base station apparatus by carrier aggregation using a plurality of cells including at least a first cell and a second cell, each of the plurality of cells having a different frequency, the method comprises:
   receiving, from the base station apparatus, a measurement configuration, wherein
   the measurement configuration includes measurement objects and reporting configurations,
   one of the measurement objects and one of the reporting configurations are linked by a measurement identity,
   each of the measurement objects indicates a measurement frequency, and
   one or more of the reporting configurations each include a criterion related to event triggered reporting of measurements,
   the event triggered reporting is triggered based on evaluation of the criterion relating to an event,
   the event is related to a measurement reference cell of the plurality of cells,
   the one or more of the reporting configurations each include an event identity for selecting the criterion relating to the event; and
   determining (i) the first cell as a measurement reference cell among the plurality of the cells based on a first measurement object linked to a first reporting configuration corresponding to a first event and (ii) the second cell as a measurement reference cell among the plurality of the cells based on a second measurement object linked to a second reporting configuration corresponding to a second event; and
   performing a measurement of the first cell and a measurement of the second cell, wherein (i) a measurement result of the first cell is used as a measurement result (Ms) of a serving cell in the first event and (ii) a measurement result of the second cell is used as a measurement result (Ms) of a serving cell in the second event.

4. A method performed by a base station apparatus, the base station apparatus communicating with a terminal apparatus by carrier aggregation using a plurality of cells including at least a first cell and a second cell, each of the plurality of cells having a different frequency, the method comprising:
   transmitting, to the terminal apparatus, a measurement configuration, wherein
   the measurement configuration includes measurement objects and reporting configurations,
   one of the measurement objects and one of the reporting configurations are linked by a measurement identity,
   each of the measurement objects indicates a measurement frequency,
   one or more of the reporting configurations each include criterion related to event triggered reporting of measurements,
   the event triggered reporting is triggered base on evaluation of the criterion relating to an event,
   the event is related to a measurement reference cell of the plurality of cells,
   the one or more of the reporting configurations each include an event identity for selecting the criteria relating to the event, (i) determination of the first cell as a measurement reference cell among the plurality of the cells is based on a first measurement object linked to a first reporting configuration corresponding to a first event and (ii) determination of the second cell as a measurement reference cell among the plurality of the cells is based on a second measurement object linked to a second reporting configuration corresponding to a second event, wherein (i) a measurement result of the first cell is used as a measurement result (Ms) of a serving cell in the first event and (ii) a measurement result of the second cell is used as a measurement result (Ms) of a serving cell in the second event.

* * * * *